US012717397B2

(12) United States Patent
Webber et al.

(10) Patent No.: US 12,717,397 B2
(45) Date of Patent: Aug. 25, 2026

(54) SYSTEM AND METHOD FOR DETERMINING POWER AVAILABILITY TO CONTROL THE NUMBER OF COMPUTING PROCESSORS IN OPERATION

(71) Applicant: Digital Power Optimization, Inc., New York, NY (US)

(72) Inventors: Andrew Webber, Elmsford, NY (US); John Potts, Westminster, CO (US)

( * ) Notice: Subject to any disclaimer, the term of this patent is extended or adjusted under 35 U.S.C. 154(b) by 32 days.

(21) Appl. No.: 18/235,750

(22) Filed: Aug. 18, 2023

(65) Prior Publication Data

US 2024/0061493 A1 Feb. 22, 2024

Related U.S. Application Data

(60) Provisional application No. 63/399,506, filed on Aug. 19, 2022.

(51) Int. Cl.
*G06F 1/32* (2019.01)
*G06F 1/3206* (2019.01)
*G06F 1/3293* (2019.01)

(52) U.S. Cl.
CPC .......... *G06F 1/3293* (2013.01); *G06F 1/3206* (2013.01)

(58) Field of Classification Search
CPC ............................ G06F 1/3293; G06F 1/3206
See application file for complete search history.

(56) References Cited

U.S. PATENT DOCUMENTS

2010/0083010 A1* 4/2010 Kern .................... G06F 1/3203 714/14
2018/0120914 A1* 5/2018 Donlin ..................... G06F 1/28
2020/0142465 A1* 5/2020 Jenne ................... G06F 1/3206

* cited by examiner

*Primary Examiner* — Stefan Stoynov
(74) *Attorney, Agent, or Firm* — Attentive Law Group; Paul Ratcliffe

(57) ABSTRACT

A system and method for real time ramping, up or down, of computer processing units (CPUs) in operation based on available power from a variable power generation asset is disclosed. The system is configured with a power detection unit to analyze power provided from the variable power generation asset without the need for complex and expensive custom engineering integration. The power detection unit is configured to analyze voltage along the voltage mains line from the supplied power and apply a test load comparable to the load of one or more CPUs in a manner which does not negatively impact the CPUs already in operation. The system is able to ramp up CPUs in operation when additional power is available and ramp down CPUs when power is declining to avoid cycling of the computers when power demands exceed power availability. The system enables optimized operation of CPUs within a data center and can be implemented through a power control unit or a software control unit.

19 Claims, 14 Drawing Sheets

Figure 7:
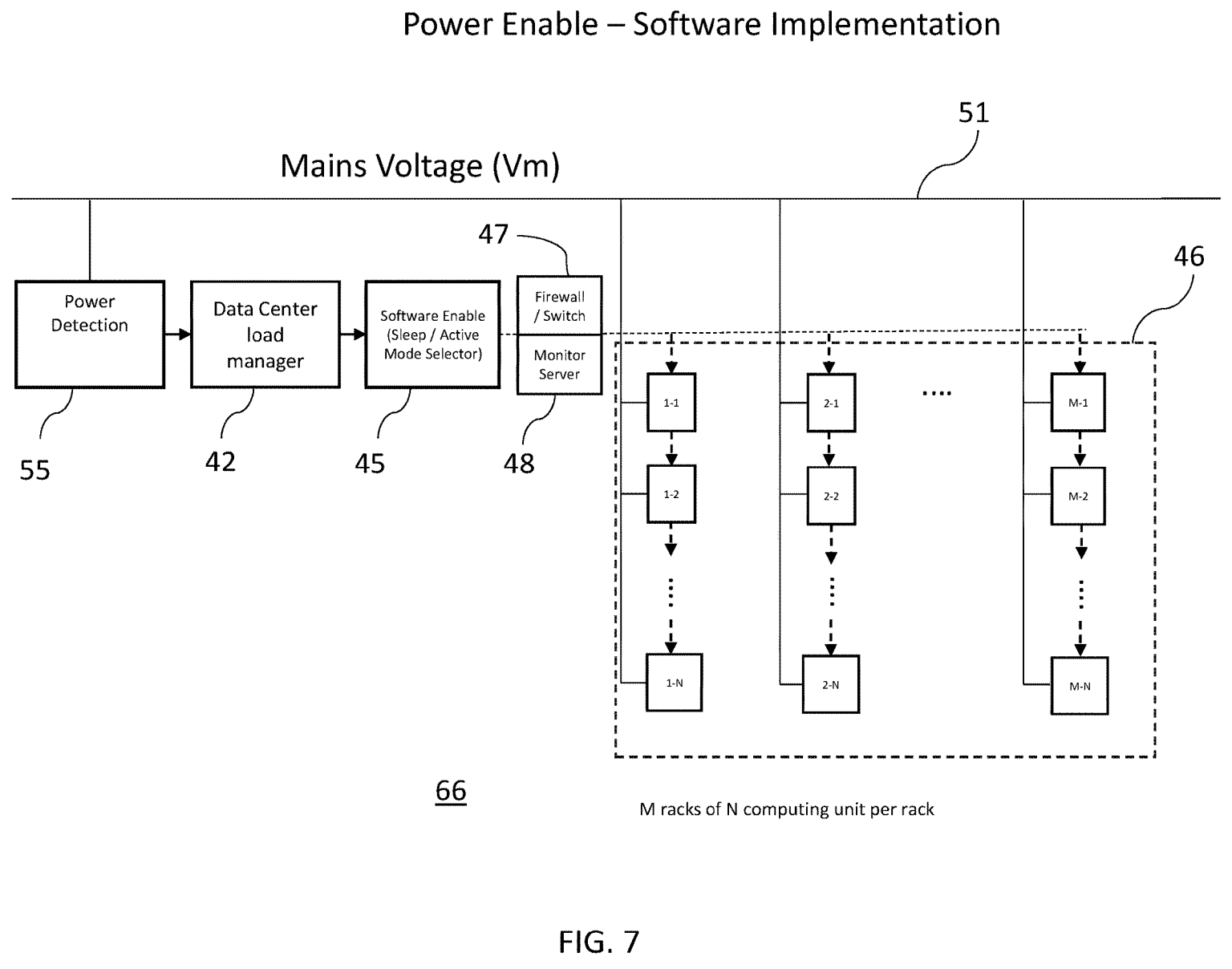

Power Enable – Software Implementation

Mains Voltage (Vm)

51

46

Power Detection

55

Data Center load manager

42

Software Enable (Sleep / Active Mode Selector)

45

Firewall / Switch

47

Monitor Server

48

1-1
1-2
....
1-N 2-1
2-2
....
2-N

....

M-1
M-2
....
M-N

M racks of N computing unit per rack

Power Detection Diagram

55

SYSTEM AND METHOD FOR DETERMINING POWER AVAILABILITY TO CONTROL THE NUMBER OF COMPUTING PROCESSORS IN OPERATION

RELATED PATENT APPLICATION AND PRIORITY

This application claims priority to U.S. Provisional Patent Application 63/399,506 filed Aug. 19, 2022, entitled "System and Method for Controlling Cryptocurrency Mining Based on Power Detection Analysis," which is incorporated herein by reference in its entirety.

BACKGROUND OF THE INVENTION

The present invention generally relates to a system and method for optimizing processor or CPU usage in a data center when the data center is dependent on a variable power source. More specifically, the present invention relates to a system and method for increasing or decreasing the number of CPUs in a processing state (within a data center) based on analyzing the power coming into the data center which is especially useful in cryptocurrency mining operations.

Electrical power generated by power plants is distributed through large networks, such as power grids, which transmit the power from the power plant to power consuming customers, such as homes, factories, and office buildings (also referred to as the Utility Network). As seen in FIG. 1, electrical power generated by power plants, such as a variable power generating asset 12 is distributed through the meter 16 to the utility network 18 and sold to customers who are in the utility network 18 or connected to the grid. The price for power is often set by the demand for power.

Power plants 12 or other sources of power may utilize their excess power for cryptocurrency mining through CPUs which are located in a data center 14. These data centers 14 are often connected directly to the power plant 12 through power lines 15. This is often referred to as "behind the meter" processing since the data center 14 is connected to the power plant 12 prior to the meter 16. Cryptocurrency mining is a compelling revenue generating opportunity for the power plants 12 to earn cryptocurrencies, for example, Bitcoin. To maximize the potential revenue, these power plants 12 need to maximize the number of CPUs in operation in order to increase the mining capacity. However, many of the power plants 12 have a variable power output. This variable power out presents a challenge in determining the number of CPUs which can be powered to maximizing the efficiencies. For example, a solar farm produces different or variable power throughout the day from sunrise to sunset and no power after sunset. Further, bad weather, storms, and clouds can impact the power generated from the solar farm while such temporary weather may dissipate quickly. These variable power generation assets 12 can add a power storage bank. However, the power storage banks are costly increasing the investment cost to start or expand a crypto mining operation.

Since data centers 14 and variable power generation assets 12 have varying physical and technical challenges, parties have tried creating tailored solutions which requires extensive system engineering and integration costs further increasing the cost.

Based on the above-mentioned challenges, it is highly desirable to provide a system and method for analyzing power at the data center using a reasonably priced solution which can work for most power generation to data center integrations for use in ramping up and ramping down the number of mining CPUs in operation based on the real time available power being generated. Further, such a system should be able to maximize the number of mining CPUs in operation based on available power but also power down CPUs in a logical manner to prolong the usage of the mining CPUs by avoiding problematic operating conditions.

SUMMARY OF THE INVENTION

The present invention generally discloses a system and method for controlling the ramping up and ramping down of mining CPUs based on real time power production from a variable power generation asset or any available variable power supply. The present invention provides various devices, systems and methods for analyzing or testing the available power and then working with a control system to manage mining CPUs in the data center.

In one embodiment, the system includes a power detection unit 55 which includes appropriate components to accurately determine the power characteristics of available power to determine if the data center should put additional CPUs into operation mode or reduce the number of additional CPUs in operation. The power detection unit 55 works with a Data Center load manager 42 which is configured to control the mining CPUs.

The system can also comprise a smart analysis processing system for retrieving power price data from the power plants and cryptocurrency coin price data. The smart analysis processing system is in communication with one or more data controllers, configured to control the operation of one or more mining computers/CPUs or cryptocurrency machines, which are assembled in one or more racks such as rack 1, rack 2, and rack n, etc. In one embodiment, the system is configured to analyze power price and control data flow to or from one or more power plants in order to determine whether a given cryptocurrency machine or mining computer/CPU is processing or not processing based on the power price and data flow from the power plants for cryptocurrency mining.

The present invention provides an incremental power enable system comprising: a variable power source for supplying power to a data center; a plurality of computing systems within the data center, wherein the plurality of computing systems are configured to receive power from at least one power source; an inverter to convert direct current to alternating current and to power the data center, wherein the inverter is connected to the direct current variable power source and to the data center; a power detection unit connected to a power supply line connected to the inverter; wherein the power detection unit tests the current of the variable power source coming from the inverter and determines if a there is enough power to provide power to an additional computing system from the plurality of computing systems; a data center load manager connected to the power detection unit and the plurality of computing systems, wherein the data center load manager controls the number of computing systems in operation from the plurality of computing systems based on a signal from the power detection unit. The incremental power enable system may further comprise a computing enable unit, wherein the computing enable unit is connected to or integrated into the data center load manager and the plurality of computing systems. The computing enable unit of the incremental power enable system may be comprised of is a power enable unit which controls power to the plurality of computing systems and can increase or decrease the number of computing systems in operation from the plurality of computing systems based on the power detection unit test. The computing enable unit of the incremental power enable system may be a software enable unit which controls the flow of data to the plurality of computing systems and can increase or decrease the number of computing systems in operation from the plurality of computing systems based on the power detection unit test.

The power detection unit of the present invention further comprise: a test load, an amplifier, a variable current source, a voltage monitor, a voltage set point, and a control system; wherein the test load is set to the power load of one or more computing systems; wherein the voltage set point is set to a voltage below the mains voltage line of the data center; wherein the control system receives an input voltage from the voltage across the test load and receives an input from the voltage mains line; wherein the variable current source is driven by the output of the amplifier; and wherein the control system determines power through the test load and determines if the if the power through the test load is equal, greater than, or less than the power required for one or more computing systems of the plurality of computing systems. Further, the test load is equivalent to a power load of one computing system of the plurality of computing systems, and the test load can be variable. The system of the present invention can increase or decrease the number of computing systems in operation based on the analysis of the power detection unit.

The present invention also provides a power detection unit for a data center comprising: a test load, an amplifier, a variable current source, a voltage monitor, a voltage set point, and a control system; wherein the test load is set to the power load of one or more computing systems within the data center; wherein the voltage set point is set to a voltage below the mains voltage line of the data center; wherein the control system receives an input voltage from the voltage across the test load and receives an input from the voltage mains line; wherein the variable current source is driven by the output of the amplifier; and wherein the control system determines power through the test load and determines if the if the power through the test load is equal, greater than, or less than the power required for one or more computing systems of the plurality of computing systems. Further, the power detection unit is connected to a variable power source. The power detection unit is connected to a plurality of computing systems within the data center, wherein the plurality of computing systems are configured to receive power from the variable power source. Further, the power detection unit is connected to a data center load manager and a plurality of computing systems; and wherein the data center load manager controls the number of computing systems in operation from the plurality of computing systems based on an analysis from the power detection unit.

In addition, the present invention provides a method of incrementally increasing or decreasing a plurality of computing system in operation in a data center based on available power from a variable power source, comprising the steps of: determining by a power detection unit if a mains voltage of the data center is less than a voltage set point; reducing, if the voltage mains is less than the voltage set point, the number of computing systems in operation by at least one computing system; analyzing, if the voltage mains is greater than the voltage set point, if there is enough power to power an additional computing system by; powering an amplifier in the power detection unit, wherein the amplifier is used to power a variable current source; analyzing a voltage of the variable current source across a test load; determining available power based on the voltage of the variable current source across the test load and the variable current; determining if the available power is equal to or greater than a power level required for at least one computing system of the plurality of computing systems; checking to see if all computing units of the plurality of computing units are in operation; transmitting, if all computing units are not in operation, a signal to a data center load manager to increase the number of computing systems in operation by at least one computing system; and repeating, if all computing units are in operation, the above steps.

The steps of the method of the present invention further include controlling the number of computing systems in operation of the plurality of computing system by controlling the supply of power to the one or more computing systems of the plurality of computing systems by controlling the supply of data to the one or more computing systems of the plurality of computing systems.

Other objects, features, and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The embodiments herein will be better understood from the following detailed description with reference to the drawings, in which:

FIG. 7 provides a system diagram of the present invention along the mains voltage line and employing a software enabled data control system.

DETAILED DESCRIPTION

Figure 1:
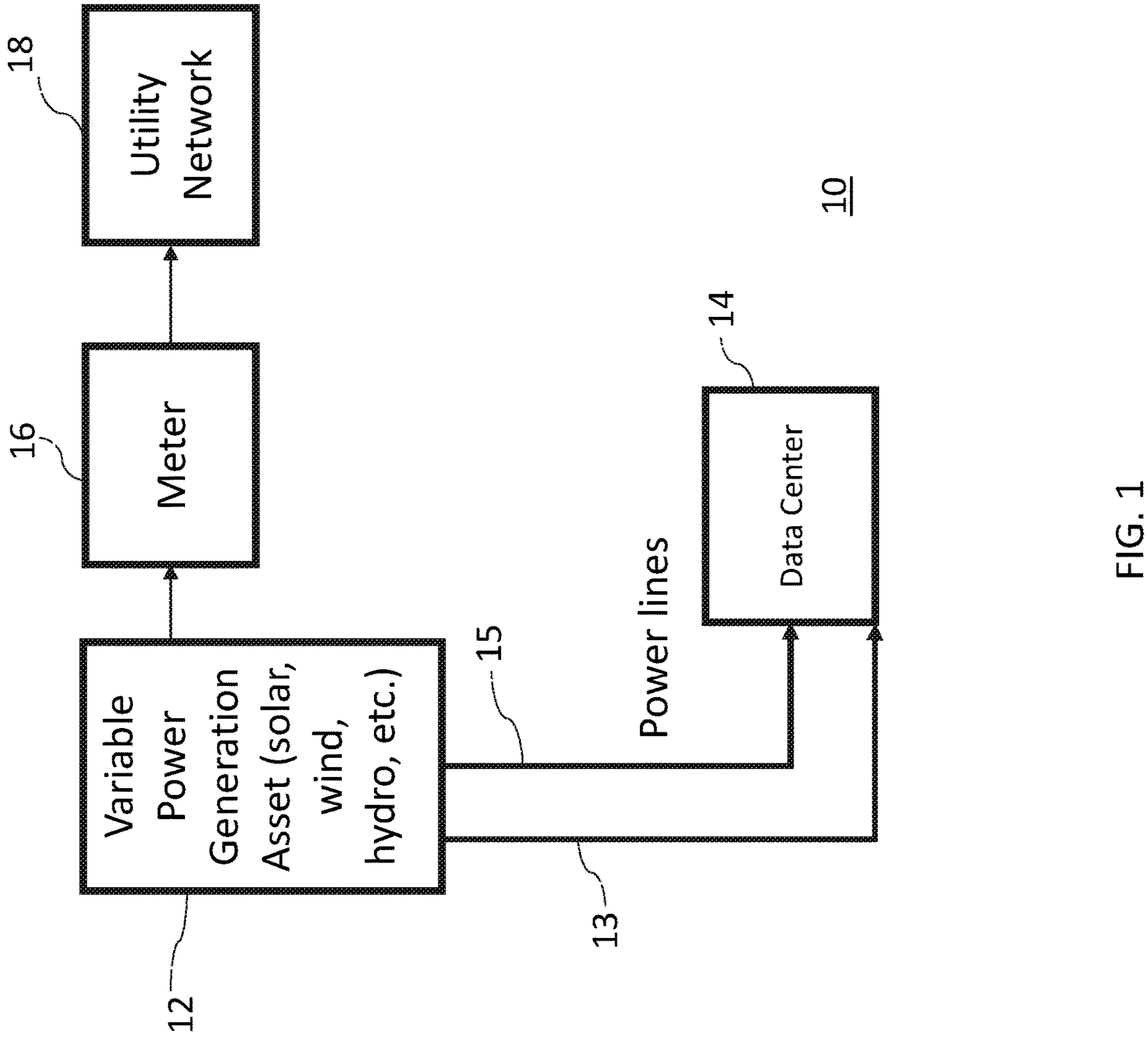
FIG. 1 provides a schematic block diagram of a variable power behind the meter data center system.

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Embodiments of the present disclosure will be illustrated below in conjunction with the various figures.

Various embodiments of the present disclosure are described with reference to the accompanying drawings. Accordingly, those of ordinary skill in the art will recognize that a modification, an equivalent, and/or an alternative on the various embodiments described herein may be variously made without departing from the scope and spirit of the present disclosure. With regard to the description of the accompanying drawings, similar elements may be marked by similar reference numerals.

In the present disclosure, the expressions "have", "may have", "include", "comprise", "may include", and "may comprise" used herein indicate the existence of corresponding features (e.g., elements such as numeric values, functions, operations, or components) but do not exclude the presence of additional features.

In the present disclosure, the expressions "A or B", "at least one of A and/or B", "one or more of A and/or B", and the like used herein may include any and all combinations of one or more of the associated listed items. For example, the expressions "A or B", "at least one of A and B", and "at least one of A or B" may refer to all of a case (1) where at least one A is included, a case (2) where at least one B is included, and a case (3) where both of at least one A and at least one B are included.

The terms "first", "second", and the like used herein may refer to various elements of various embodiments but are not intended to limit the elements. Furthermore, such terms may be used to distinguish one element from another element. For example, "a first user device" and "a second user device" may indicate different user devices regardless of the order or priority thereof. For example, "a first user device" and "a second user device" indicate different user devices.

It is intended that when an element (e.g., a first element) is referred to as being "(operatively or communicatively) coupled with/to" or "connected to" another element (e.g., a second element), the element may be directly coupled with/to or connected to the other element or an intervening element (e.g., a third element) may be present. In contrast, when an element (e.g., a first element) is referred to as being "directly coupled with/to" or "directly connected to" another element (e.g., a second element), it is intended that there are no intervening element (e.g., a third element).

According to the situation, the expression "configured to" may be interchangeably used with the expressions "suitable for", "having the capacity to", "designed to", "adapted to", "made to", or "capable of". The term "configured to" may not indicate only "specifically designed to" in hardware. Instead, the expression "a device configured to" may indicate that the device is "capable of" operating together with another device or other components. A central processing unit (CPU), for example, a "processor configured to perform A, B, and C", may indicate a dedicated processor (e.g., an embedded processor) for performing a corresponding operation or a general-purpose processor or portion of a processor (e.g., a CPU or an application processor (AP)) which may perform corresponding operations by executing one or more software programs which are stored in a memory device.

Terms used in the present disclosure are used to describe certain embodiments but are not intended to limit the scope of the present disclosure. A term of a singular form may include a plural form unless otherwise indicated. Unless otherwise defined herein, all the terms used herein, may have the same meanings that are generally understood by a person skilled in the art. It may be further understood that terms, which are defined in a dictionary and commonly used, should also be interpreted as is customary in the relevant related art and not in an idealized or overly formal manner unless expressly so defined herein in various embodiments of the present disclosure. In some cases, even if terms are defined in the present disclosure, they are not intended to be interpreted to exclude embodiments of the present disclosure.

An electronic device according to various embodiments of the present disclosure may include at least one of smartphones, tablet personal computers (PCs), mobile phones, video telephones, e-book readers, desktop PCs, laptop PCs, netbook computers, workstations, servers, personal digital assistants (PDAs), portable multimedia players (PMPs), moving picture experts group (MPEG-1 or MPEG-2), audio layer 3 (MP3) players, mobile medical devices, cameras, wearable devices (e.g., head-mounted-devices (HMDs), such as electronic glasses), an electronic apparel, electronic bracelets, electronic necklaces, electronic accessories, electronic tattoos, smart watches, and the like. An electronic device may also be an electronic circuit, such as an application specific integrated circuit (ASIC), or any device which includes an electronic circuit.

Hereinafter, an electronic device according to the various embodiments of the present disclosure may be described with reference to the accompanying drawings. The term "user" used herein may refer to a person who uses an electronic device or may refer to a device (e.g., an artificial intelligence electronic device) that uses an electronic device.

"Electrical grid" or "grid," as used herein, refers to a Wide Area Synchronous Grid (also known as an Interconnection), and is a regional scale or greater electric power grid which operates at a synchronized frequency and is electrically tied together during normal system conditions. An electrical grid delivers electricity from generation stations to consumers. An electrical grid includes: (i) generation stations that produce electrical power at large scales for delivery through the grid, (ii) high voltage transmission lines that carry that power from the generation stations to demand centers, and (iii) distribution networks which carry that power to individual customers.

FIG. 1 provides a typical behind the meter data center system 10 for powering a data center 14 such as a cryptocurrency mining data center. The data center 14 is connected via power lines 15 to a power source such as a variable power generation asset 12. The variable power generation asset 12 could be power generated from a solar farm, wind farm, hydro power, or similar type power source. The variable power generation asset 12 provides power directly to the data center 14. In addition, the variable power generation asset 12 has a control connection 13 connected to the data center 14. The control connection 13 could be various types of connections or multiple connections including a mod, tcp, ip, or similar type connection. The behind the meter data center 14 can be manually controlled to operate more or less computers or mining CPUs based on the available power from the variable power generation asset 12. The variable power generation asset 12 is often a power source which generates power from renewables such as solar, wind, hydro. However, variable power generation assets 12 have varying power outputs based on the time of day, time of year, and weather.

Figure 2:
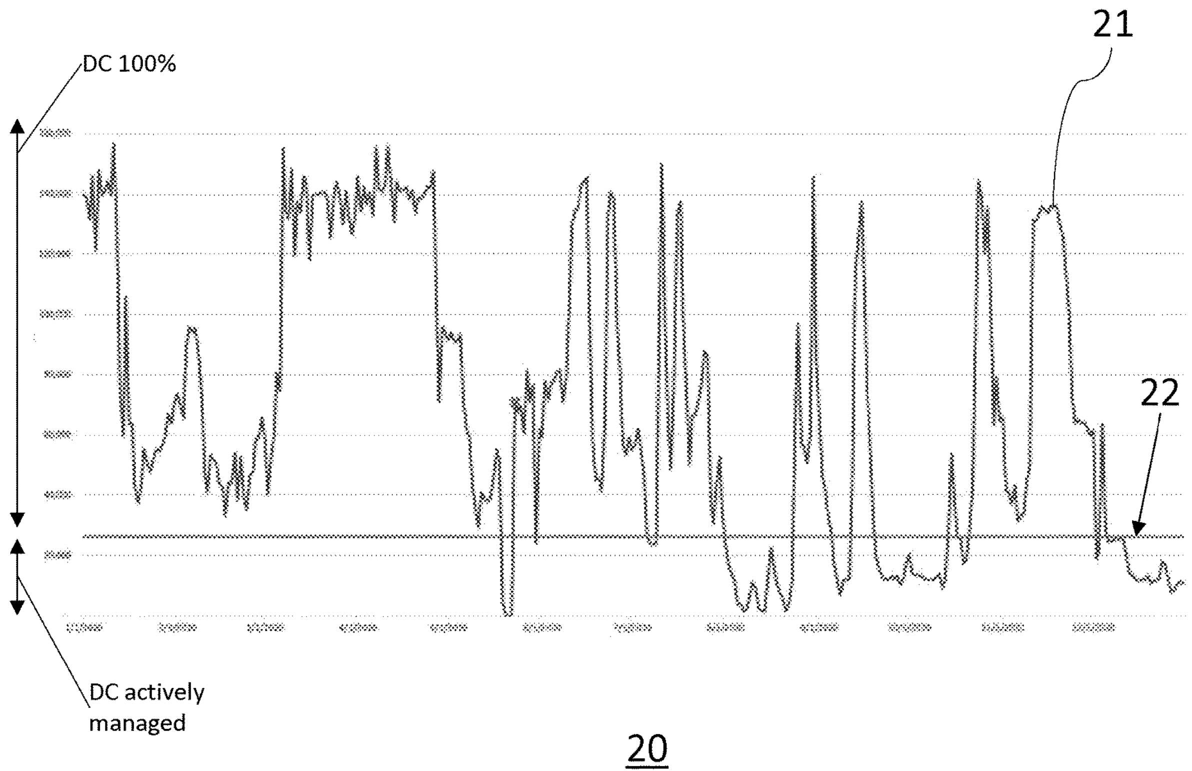
FIG. 2 provides a graph diagram showing an illustrative example of daily power generation from a variable power generation asset over a duration of time.

FIG. 2 provides an exemplary graph of the daily power produced by a hydro asset over the course of a year. As previously discussed, since the variable power generation asset 12 may have a variable power output dependent on the time of day, time of year, and/or the weather, the variable power generation asset 12 oftentimes can produce power below the power consumption line 22 or above the power consumption line 22. As indicated in the graph by line 21, the power produced by the variable power generation asset 12 (see FIG. 1) can be seen in various instances above and below the power consumption line 22. When the power generated 21 is above the power consumption line 22, there is enough additional power produced to power varying amounts of crypto mining processing units or CPUs within the data center 14. However, when the power 21 is below the power consumption line 22, the power must be actively managed since there may not be enough power to power all of the CPUs within the data center 14. This often presents a significant challenge on how much power is available to power the processing units in the data center 14 or how many CPUs in the data center 14 can be operated. To maximize the number of processing units within the data center 14 that can be operated, what is needed is a system to help actively manage the number of units which can be put into operation within the data center 14. Ideally, the processing units in operation can vary along with the power so that the number of processing units can be both ramped up and put into operation as the power demand permits or removed from processing or operation as the available power declines.

Figure 3:
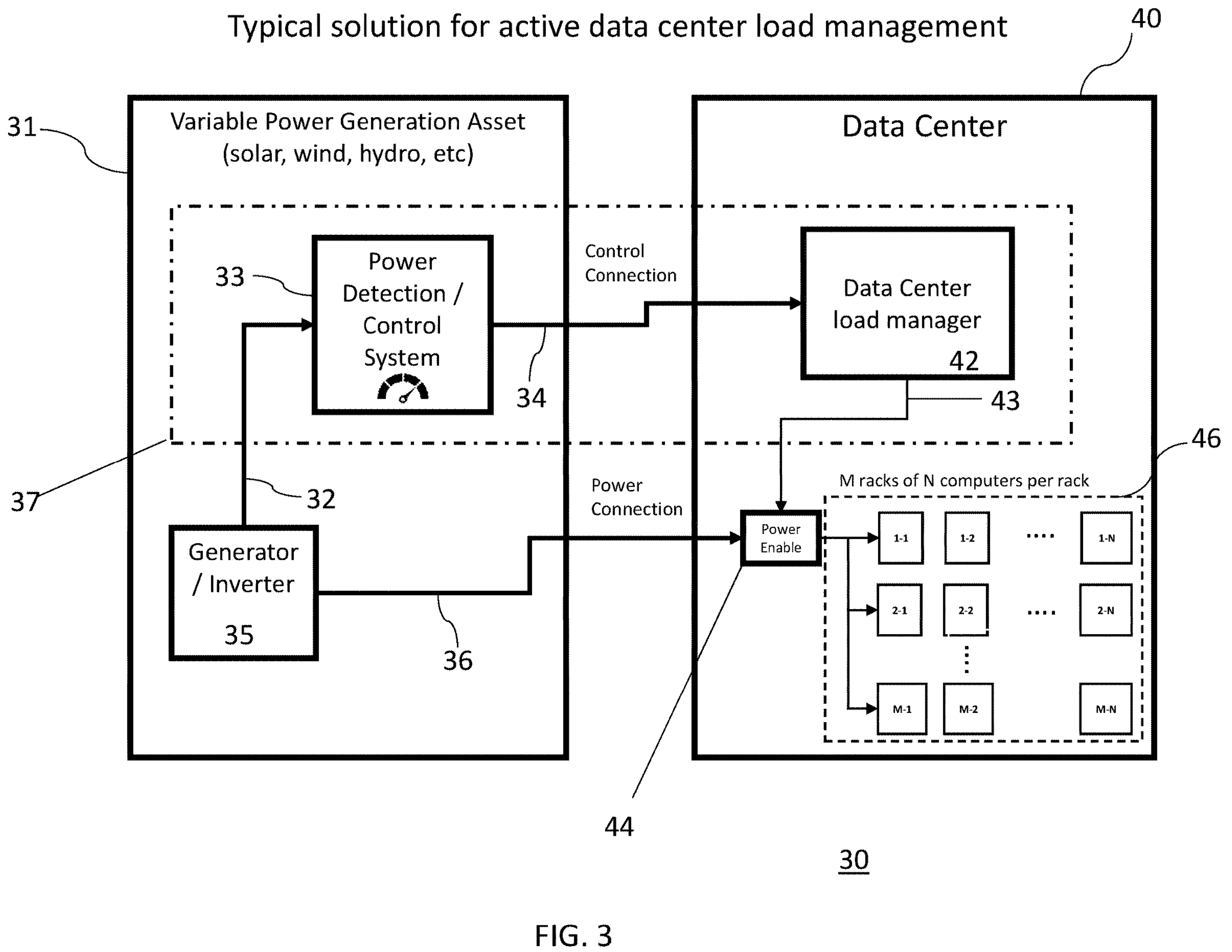
FIG. 3 displays a typical solution for a behind the meter data center system with customized integration.

FIG. 3 provides a typical solution or system 30 for managing an active data center with a varying power load. The system 30 includes a variable power generation asset 31 as well as a data center 40. The variable power generation asset 31 includes a power detection control system 33 which is connected to a generator/invertor 35 via line 32. The power detection control system 33 is connected to a data center load manager 42 within the data center 40 by a control connection 34. The generator invertor 35 provides the appropriate power via power input line 36 to a power enabled unit 44. The variable power generation asset 31 would typically generate power in a direct current which needs to be converted to an alternating current by the generator/invertor 35, so that alternating current is provided to the power enabled unit 44 via the power line 36. Oftentimes, each variable power generation asset 31 and data center 40 have a unique set of parameters requiring the power detection control system 33 and data center load manager 42 to have a tailored mechanical, electrical, and computational configuration engineered and designed as identified by box 37. As seen in the data center 40, the data center load manager 42 is also connected to the power enabled unit 44 by a communication line 43. The data center load manager 42 helps to control the power and the CPU processing units (seen by the array of CPUs 46). The processing units 46 are oftentimes mounted within a number of CPU or server racks which can be configured or expanded depending on the appropriate power available from the variable power generation asset 31. The power detection system 33 must be designed, calibrated, and configured for each variable power generation asset 31. The data center load manager 42 must be designed, calibrated, and configured for each type of power detection system 33. Each project or installation with an actively managed data center load manager 42 is specifically designed and calibrated which requires a significant amount of engineering for each project. The power enabled unit 44 can be a hardware solution such as a system using one or more contactors, relays, and switches, or can be a software solution which helps to control power to the processing units 46 or control data flow to the processing units 46 to process such data or go into a sleep mode. As previously mentioned, the challenge is the significant amount of tailored engineering required for each variable power generation asset 31 and data center load manager 42. Therefore, what is needed is a solution which can be installed or integrated into the system 30 which can automatically adjust to the power output of the variable power generation asset 31, the capabilities of the data center 40 and the data center load manager 42.

Figure 4:
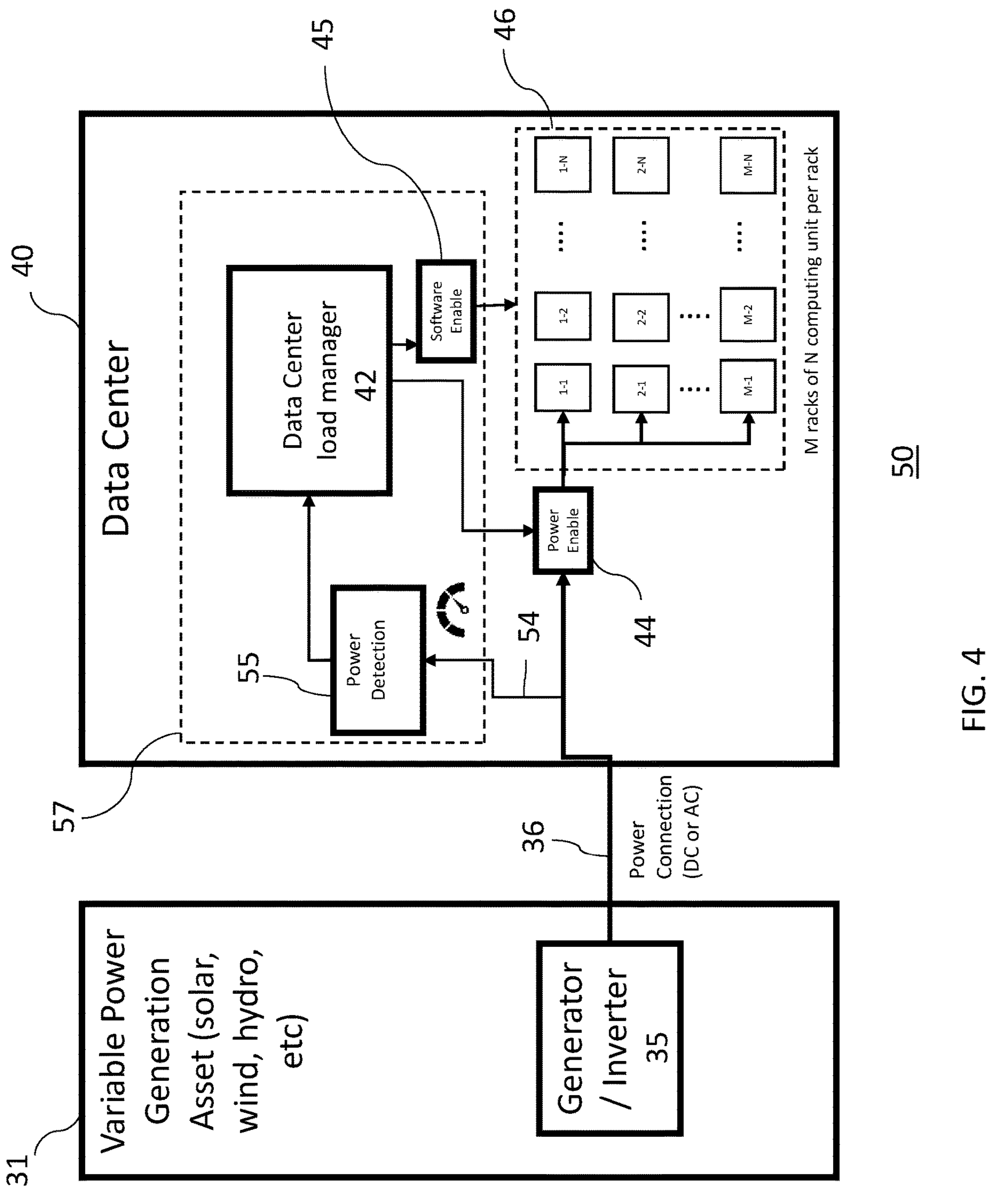
FIG. 4 provides a system diagram of the preferred embodiment of the present invention providing a behind the meter data center system with a power detection unit and a data center load manager.

FIG. 4 illustrates a preferred embodiment of the present invention which provides a system 50 which solves the need to perfectly engineer each variable power data center installation. The system 50 includes variable power generation asset 31 which includes a generator invertor 35. The generator invertor 35 converts DC power to AC power, which is then provided to the power enabled unit 44. In some installations, the generator/invertor 35 could provide DC or AC power to the data center 40 based on the data center's 40 desired power input or the generator/invertor 35 could be located within the data center 40. The data center 40 includes the data center load manager 42, a power enabled unit 44, a software enable unit 45, the rack of processing units 46, also referred to as CPUs, as well as a power detection unit 55. The system 50 does not need to employ both the power enable unit 44 and software enable unit 45 and could only employ one or could utilize both. The system 50 of the present invention provides a unique way providing a flexible solution that allows the power detection unit 55 to interact with the data center load manager 42 while avoiding the need for custom engineering. The power detection unit 55 is connected to the power input line 36 so that it can detect or determine if there is enough available power coming in from the variable power generation asset 31 to increase the number of CPUs processing or mining (within the array of CPUs 46) or determine if there is a decreasing power requiring the data center load manager 42 to reduce the number of CPUs processing data. The flexible power detection unit 55 communicates one or more power availability data aspects to the data center load manager 42 which enables the data center load manager 42 to control the power enabled unit 44 or the software enable unit 45 to control the number of CPUs 46 and which CPUs are in operation.

The data center load manager 42 includes a processor, memory, software or instructions, a communication module or subsystem, and hardware. The communication module or subsystem may also include software components, hardware components, or a combination of both. For example, the communication module or subsystem may include a network card (e.g., a wireless network card and/or a wired network card) that is coupled with software to drive the card. The communication module is used to receive and transmit data to the power detection unit 55 or to the power enable unit 44 or software enable unit 45. The data center load manager may include a data processing subsystem. The data processing subsystem may include software components, hardware components, or a combination of both. The data processing subsystem may perform data collection operations, dataset creation operations and/or other suitable operations.

The power enabled unit 44 or software enable unit 45 in conjunction with the data center load manager 42 regulates the CPU units within the CPU array 46 to control the number of units which are put into operation and which CPU units within the array are in operation. By detecting power at the data center load side, the power load system does not need to be implemented at the power generation side. Additionally, the flexible power detection unit 55 would make the data center load manager 42 compatible with a wide variety or array of power generation assets 31. Of particular importance, the tailored design, tuning and custom integration of a typical power detection system and the data center load manager (as discussed in FIG. 3) would no longer be required. This results in significant cost savings, engineering time, capital investment, etc. It also significantly decreases the integration time to enable an array of CPUs 46 to be put into operation at a variable power generation asset 31 location.

Figure 5:
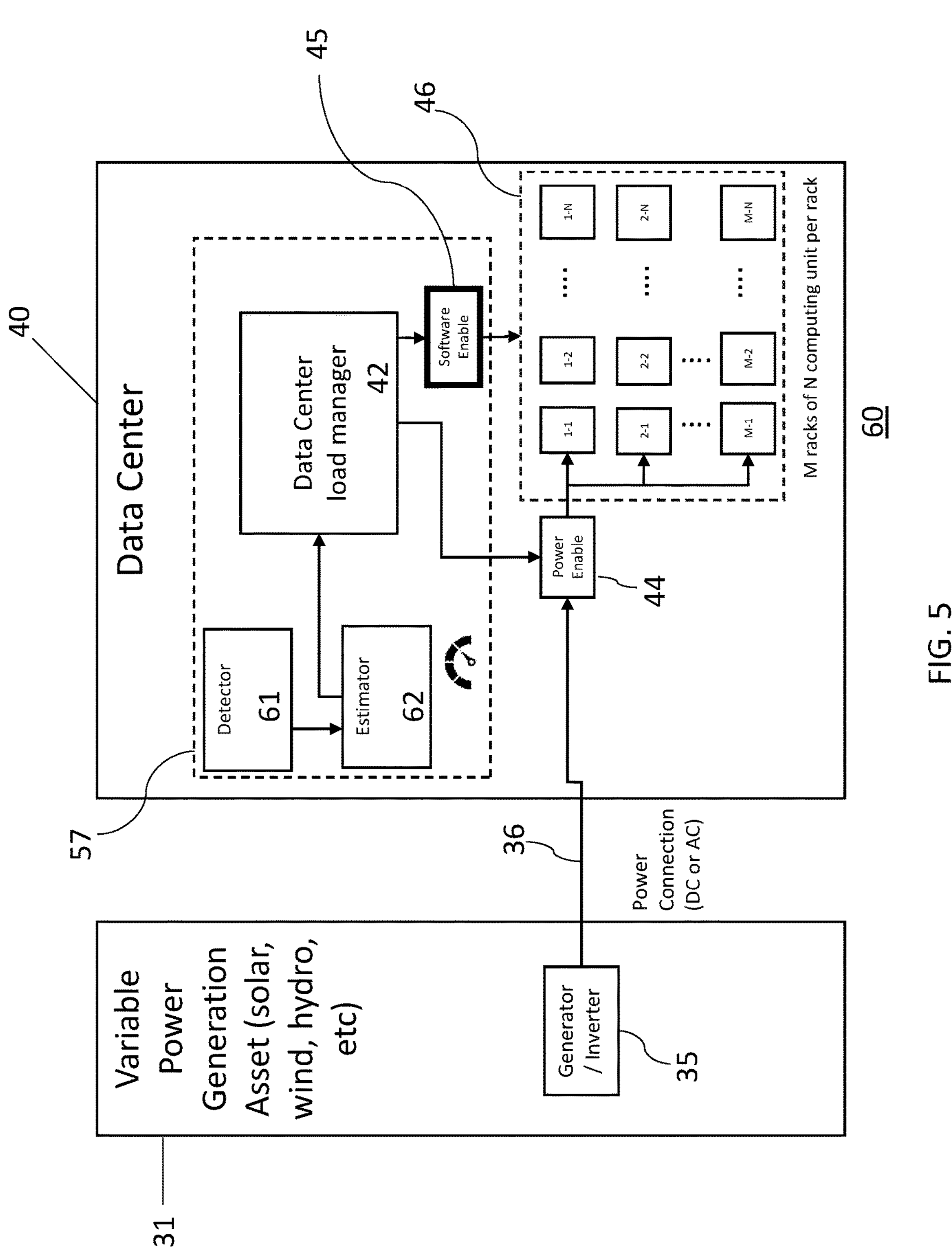
FIG. 5 provides a system diagram of an alternative embodiment of the present invention providing a behind the meter data center system with a detector, estimator, and data center load manager.

FIG. 5 provides an alternative embodiment of the present invention which provides a system 60 that incorporates both a power detector 61 and estimator 62 within the data center 40. This alternative embodiment would include an ability to detect the energy available from the variable power generation asset 31 by using a calibrated detector 61 and estimator 62. For example, in a solar field power asset 31, a radiation detector could be utilized near the solar panel field to estimate the power production of the entire solar field. The data from the radiation detector is transmitted or communicated to the detector 61. The detector 61, in combination with data received from and/or calculations performed by the estimator 62, would then determine an estimated power generated by the entire field. The estimated power data of the entire field from the detector 61 and estimator 62 is then fed to the data center load manager 42 which utilizes the estimated available power and then controls the power enabled unit 44 and/or the software enabled unit 45 to ramp up processing or ramp down processing of the CPUs within the CPU array 46.

In this configuration, the system 60 would not detect power directly from line 36 but would determine an estimated power of the variable power generation asset 31 from the detector 61 and estimator 62. The estimator 62 is in communication with the data center load manager 42 so the data center load manager 42 can control the number of CPUs 46 processing or mining. The detector 61 and estimator 62 only need to be calibrated to the site-specific energy characteristics of the variable power generation asset 31 to give the correct input to the data center load manager 42. Further, the system 60 can incorporate safety margins or tolerances to ensure the estimated power availability does not exceed the actual available power from the variable power generation asset 31. The site-specific commissioning process of calibrating the detector and estimator can be done over the course of several days compared to the custom engineering described in conjunction with FIG. 3. This alternative embodiment displayed in FIG. 5 provides significant economic value over the custom engineering required in standard systems.

Figure 6:
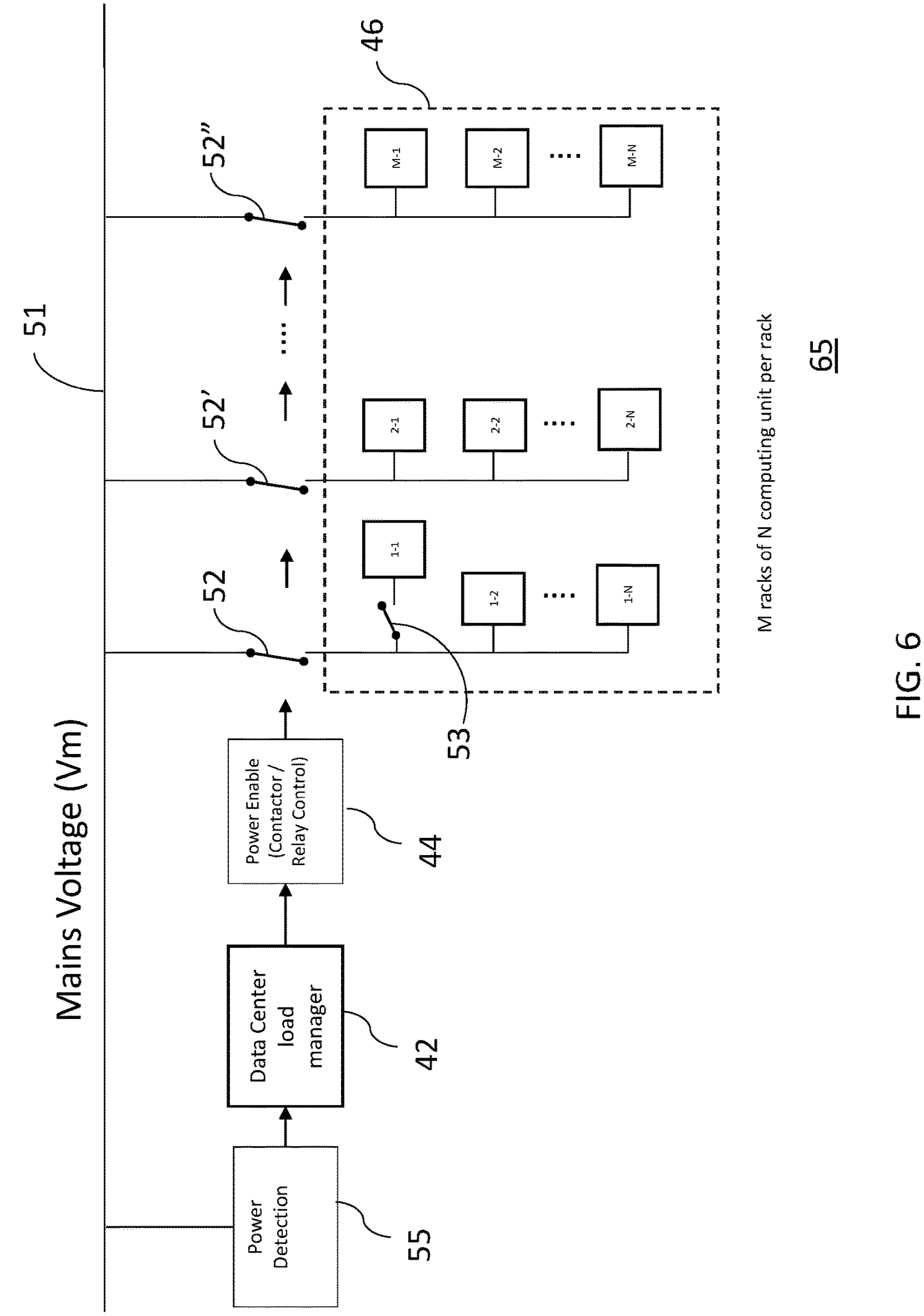
FIG. 6 provides a system diagram of the present invention employing a power enable relay controller along the mains voltage line.

FIG. 6 provides a schematic diagram of the present invention providing a mains voltage power enable system 65 employing a power enable unit 44. The power enable unit 44 includes a relay control which is utilized to control various relays or connectors 52, 52', 52" which allow power to flow through to the CPU array 46, or specifically to the CPUs within the CPU array 46. The system 65 includes a power detection unit 55 which is connected to the mains voltage line 51. The power detection unit 55 is communication with the data center load manager 42 and the data center load manager 42 is connected to the power enable unit 44. In addition, the CPUs in the CPU array 46 are also powered by and along the main voltage line 51. In between the mains voltage line 51 and connected to the CPU array 46 are one or more relay controls 52, 52', 52". As previously discussed in connection with FIG. 4, the power detection unit 55 determines if there is enough additional power from the variable power generation asset 31 provided through the mains voltage line 51 to power additional CPUs within the CPU array 46.

As previously discussed, because the CPUs in the CPU array 46 are along the mains voltage line 51 and the power detection unit 55 is along the mains voltage line 51, the power detection unit 55 is able to determine if additional CPUs will impact the power because the load of the CPUs already in operation in the CPU array 46 is already affecting the main voltage line 51. As more fully described below with reference to FIG. 10, the power detection unit 55 tests power through the load (see reference 76 in FIG. 10) to determine if an additional load negatively impacts power or if there enough power to increase the number of CPUs in operation. Provided there is enough power to increase the CPUs, the power detection unit 55 notifies the data center load manager 42 to increase the number of CPUs in operation. The data center load manager 42 then notifies the power enable unit 44 to increase the CPUs in operation by controlling the relays 52, 52', 52" to connect the appropriate number of relays 52, 52', 52" so that the appropriate number of CPUs are connected to the mains voltage line 51. Connecting the relays 52, 52', 52" then provides power to groups of CPUs to put them into operation. In addition, individual relays 53 can be deployed for each CPU within the CPU array 46 such that the power enable unit 44 can control the individual CPU relay 53. Although not depicted, each CPU unit can have their own individual relay 53 as shown in FIG. 6.

FIG. 7 provides an alternative embodiment or arrangement for controlling the CPUs via a software enable unit 45. In this embodiment, the mains voltage software enable system 66 still has the power detection unit 55 along the mains voltage line 51 and the CPUs within the CPU array 46 are also connected to the mains voltage line 51. As discussed below in conjunction with FIG. 10, the power detection unit 55 is able to determine if there is enough power to power an additional CPU or additional CPUs. Since the CPUs in operation within the CPU array 46 are already impacting their load along the mains voltage line 51, the power detection unit 55 can determine if there is enough power to add additional CPUs when the power detection unit 55 applies a known load (see reference #76 in FIG. 10). The system 66 includes the power detection unit 55 which is connected to the data center load manager 42. The data center load manager 42 is connected to the software enable unit 45 and the software enable unit 45 is connected to one or more firewalls or switches 47 and a monitor server 48. When the power detection unit 55 determines there is enough power to increase the number of CPUs, it notifies the data center load manager 42. The data center load manager 42 notifies the software enable unit 45 to increase the number of CPUs in operation. The software enable unit 45 then determines which CPUs within the CPU array unit 46 should be put into operation. The CPUs within the CPU array unit 46 are in a low power state or sleep mode and would transition into operation when receiving data or calculations to run for cryptocurrency mining. The software enable unit 45 then allows the transmission of data to the specific CPUs desired to be put into operation by controlling the firewall(s) or switch(es) 47 to allow data to flow to the selected CPUs. The monitor server 48 helps to monitor which CPUs are in operation, which CPUs are in sleep mode, as well as the historical usage data of the CPUs within CPU array unit 46 to balance operation amongst the CPUs. The control of data to the CPUs, by the data center load manager 42, software enable unit 45, and firewall/switches 47 is further described in U.S. patent application Ser. No. 17/700,020 filed on Mar. 21, 2022, which is incorporated herein by reference in its entirety.

Figure 8:
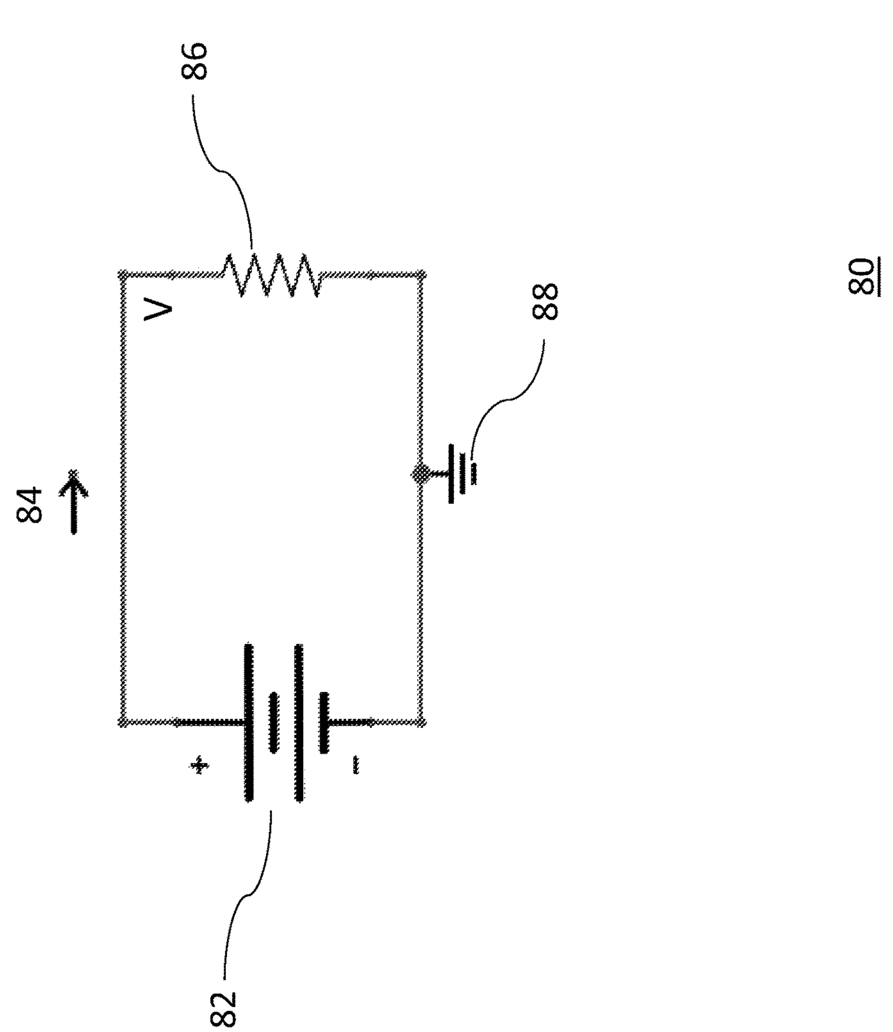
FIG. 8 provides a circuit diagram of the power detection problem for a direct current.

FIG. 8 provides a diagram of a typical circuit 80 of the power detection problem present in most instances. The circuit 80 includes the power source 82, the current 84, a resistor or load 86, and a ground 88. The power in watts can be expressed as W=V×I, where V is the voltage across the load 86 and I is the current flowing through the load 86. The load in this instance is the resistor 66. The current I can be expressed by the equation I=V/R, or voltage divided by resistance. Changes in load 86 will change the current 84 and therefore, the power drawn or available from the power source 82. In application, if more CPU units are utilized, it will increase the load which changes the current and therefore, the power drawn or available from the power source 82. The power and current are therefore dependent upon connected load. Put into simpler terms, the number of CPU units within operation within the CPU array 46 cannot draw more power than is available from the power source 65. Although voltage may be easily monitored, the power available per load may not be measured or calculated without a load connected. Adding new CPUs from array 46 will change the load. Trial and error of connecting loads (number of CPUs in operation in a data center) is not an optimal solution to measure available power for predicting data center applications as cycling computers on and off frequently decreases the life span of the computers or CPUs. This constant powering on and off cycling of CPUs is an undesired outcome. Further, a trial connection of various loads may also drop voltage too low for the entire network resulting all CPUs to power down. Putting CPUs into operation or ramping up the processing of CPUs constantly changes the load and available current. Therefore, what is needed is a system which can accurately determine, predict, or measure the available power with the load applied to determine the appropriate number of CPUs to put into operation or to verify there is enough available power to add more CPUs into process. Or alternatively, to determine there is not enough available power, and ramp down the number of CPUs in operation. Ultimately, the goal of the present invention is to determine the number of units to put into a processing mode without degrading the available power and current and then automatically, through the data center load manager 42, adjusting the CPUs in operation up or down as power changes.

Figure 9:
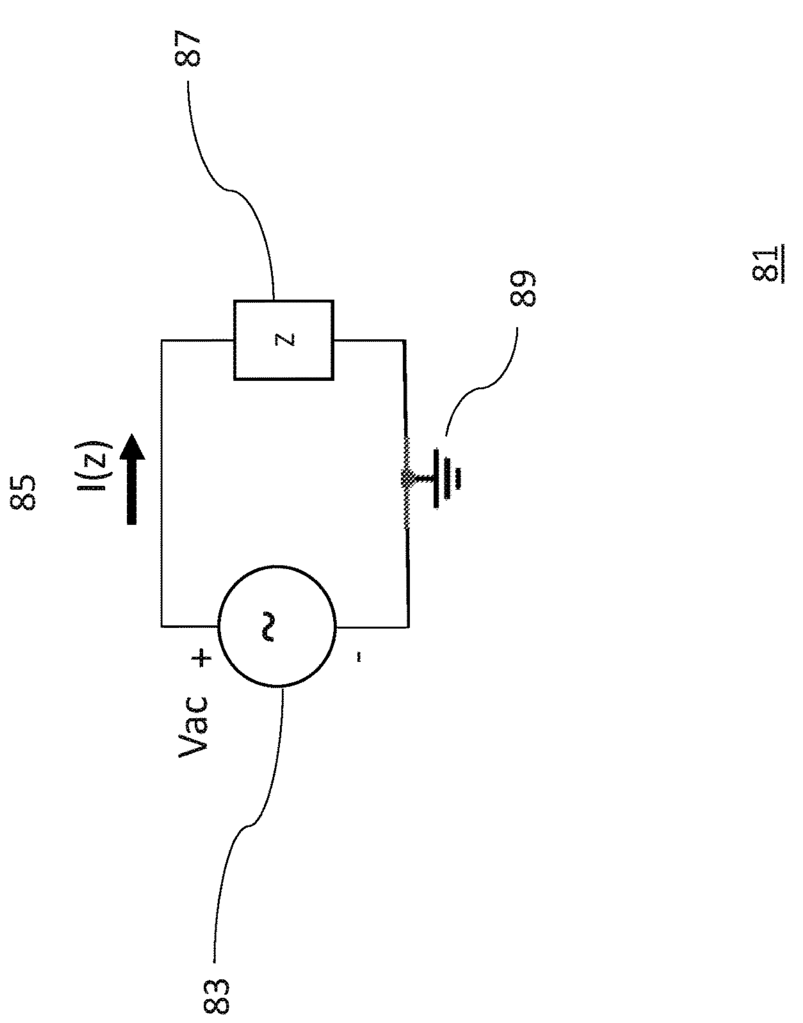
FIG. 9 provides a circuit diagram of the power detection problem for an alternating current.

FIG. 9 provides a diagram of a circuit 81 of the power detection problem with an alternating current. The circuit 81 contains an alternating power source 83, the current 85, a resistance or load 87, and a ground 89. The power detection problem with an alternating current power source 83 is similar to the power detection problem with a direct current discussed with regards to FIG. 8. However, since this is an alternating current, the calculations for determining available power are different. The detection unit 55 for an alternating current can be configured to determine or detect average power (also referred to as RMS) or to determine and detect instantaneous power (also referred to as Peak or peat-to-peak power).

For example, the power in Watts can be expressed by: W=V*I*cos Φ where V is the voltage across a load, I is the current flowing through a load, and Φ is the phase between V and I. The current, I, can be expressed by: I=V/Z where Z is phase impedance of a load. Changes in load will change the current, and therefore the power drawn from the power source. The power flowing, then is a function of the load connected. Although voltage may be easily monitored, the power available for a load may not be measured or calculated without the load connected. Trial and error of connecting loads in a data center is not an optimal solution to measure available power for data center applications as cycling computers on and off frequently will decrease the lifespan of the computers. Trial connections of load may also drop voltage too low for the entire network of computers already in operation.

As discussed above in conjunction with FIG. 6 and FIG. 7, the power detection unit 55 is connected to the mains voltage line 51 and the load 87 relates to the power required to power an additional CPU unit or additional CPU units. Depending on the amount of load 87, the current 85 through the load and the power available will vary. Although voltage may be monitored, the power available based on the load may not be easily determined simply by measuring power by alternating power source 83. Specifically, the power detection unit 55 needs to determine if there is enough power to add another CPU. Thus, the load 87 is applied to the power source 83 to determine if there is enough power and current 85 to avoid any power outages or CPU cycling of the CPUs already in operation. Since the power detection unit 55 and the CPUs within the CPU array 46 are all along the mains voltage line 51, the load 87 applied will verify another CPU can be added even with the load of the CPUs already in operation. Importantly, as further discussed in conjunction with FIG. 13, since the system does not test the voltage through the test load 76 unless the power detection unit 55 verifies the voltage mains (Vm) is above the voltage set point (Vs), the test load 76 does not negatively impact the CPUs already in operation along the voltage mains line 51.

Figure 10:
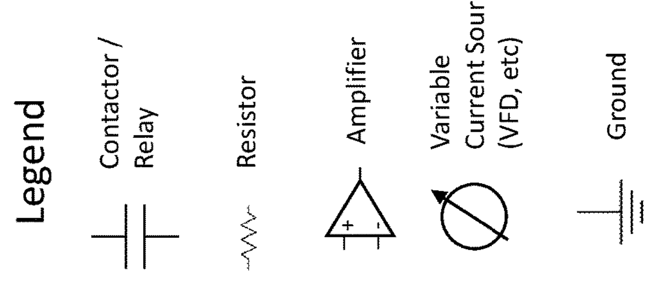
FIG. 10 provides a schematic power detection diagram according to one embodiment of the present invention.
Figure 10:
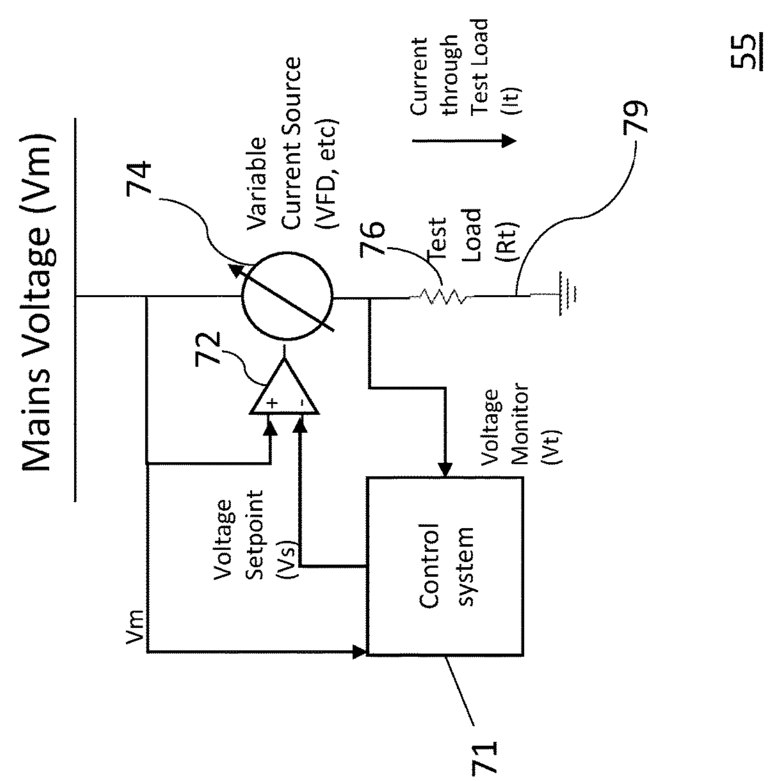

FIG. 10 provides a circuit diagram of the power detection unit 55 within data center 40 of the system 50 shown in FIG. 4. The power detection unit 55 is realized through a test load 76, an amplifier 72, a variable current source 74, and a control system 71. The control system 71 has an output as a voltage set point or Vs which is sent to the amplifier 72. The voltage set point (Vs) can be set or selected by the user or determined by the system through analysis by the power detection unit 55. The control system 71 also has an input Vt which is the voltage across the test load 76 and receives an input of the main voltage Vm. The variable current source 74 is driven by the input of the output of the amplifier 72. The test load 76 is a constant or unvarying resistive load (a known value). As depicted, the test load 76 is also grounded at connection 79. Vs, or the voltage set point, is some voltage below the typical mains voltage Vm and is also above the minimum voltage for the data center operation. The min voltage or minimum voltage is the minimum operational voltage required on the voltage mains line 51 (see FIG. 7) for the data center 40 to run correctly. A quick example, some ASICs are known to run well from 200-240 v. On this system, 220 v would be a standard mains voltage. The min voltage would be 200 v. A voltage setpoint Vs, for example, could be **210*v* (below typical, but above min). This description provides exemplary structure corresponding to the recited control functions of the control system 71**, as referenced in the claims.

Continuing with FIG. 10, Vt is the voltage across the test load 76. The current (It) through the test load 76 can be sampled from the variable current source 74 as a feedback to the control system 71. Current (It) is calculated by current Iv=Vt/Rt, which is the current through the test load 76 equals the voltage across the test load 76 divided by the resistance of the test load 76. Then, power through the test load 76 can be determined by the control system 71 by the equation Pt=Vt×It, or power to the test load equals the voltage monitored through the test load times the current through the test load. The power detection unit 55 can then be used to monitor the available power, voltage, and current available, in real time, from the variable power generation asset 31. Since the test load 76 is a known or a set value, the unit 55 can be configured to test against the required load of adding another CPU (or group of CPUs). Since the CPUs (see FIG. 7) are all along the mains voltage line 51, adding one more CPU along the mains voltage line 51 will add a load equivalent or similar to the test load 76. Therefore, the power detection unit 55 can determine power through the test load 76 and if there is enough power it can notify the data center load manager 42 to turn on another CPU (or group of CPUs). If there is not enough power through the test load 76 the unit 55 will determine if the minimum Voltage (Vm) is less than the voltage setpoint (Vs). If not, the unit will pause and then retest to see if another CPU can be added. If Vm is less than Vs, then the unit 55 instructions the data center load manager 42 to remove a CPU from operation. A system flow logic is more fully described below in conjunction with FIG. 13.

The control system 71, of the unit 55, will give a set point to the amplifier 72 to load the mains voltage but above the minimum voltage for efficient data center operation. For example, data center 40 could operate on a range of 200 and 240 voltage AC with the typical main voltage of 220 voltage AC, a Vs, or voltage set point, could be selected of 210 voltage AC. The differentiating amplifier 72 will drive the variable current source to pull current through the test load 76 until the voltage set point equals the voltage main. The control system 71 will then measure the voltage across the test load (Vt) and calculate It and Pt. Specifically, the control system 71 will measure the monitored voltage through the test load 76 and calculate the current and power at such time. At this point, the control systems 71 will enter a decision tree which is described further in FIG. 13. The control system will also measure the Vm. Preparing the monitored Vm to the voltage main set point is critical for the ramp down feature of control system 71 as the power generating system begins to lose power. The power detection unit 55 can determine when there is additional power to increase the number of CPU units put into operation as well determine a decrease in power to decrease the number of CPU units or decrease the load as the available power down.

The test load 76 could be any electrical load characterized by any impedance including but not limited to a resistive, capacitive, and/or inductive load. The test load 76 may even be an array of various components to create a desired impedance, such as an array of relays, an RLC network (resistor, inductor, capacitor), or otherwise. Further, the test load 76 could be a smart load, which can vary the current, voltage, or phase between current and voltage. In addition, the test load 76 could be a variable load such as varistors, variable capacitors, and variable inductors.

The amplifier 72 can be a physical amplifier or can be implemented as a software amplifier embedded within or as a part of the control system 71. The software amplifier within control system 71 would still be connected to the variable current source 74 as a control system output. Therefore, FIG. 10 could easily be modified such that the amplifier 72 is no longer a hardware amplifier but is a software amplifier, or an amplifier embedded in control system 71.

The power detection unit 55 includes a processor, memory, software or instructions, a communication module or subsystem, and hardware. The communication module or subsystem may also include software components, hardware components, or a combination of both. For example, the communication module or subsystem may include a network card (e.g., a wireless network card and/or a wired network card) that is coupled with software to drive the card. The communication module is used to receive and transmit data to the data center load manager 42. The power detection unit 55 may include a control system 71 processing subsystem. The control system 71 process subsystem may include software components, hardware components, or a combination of both. The control system 71 processing subsystem may perform data perform analysis and collect data including the analysis described above.

Figure 11:
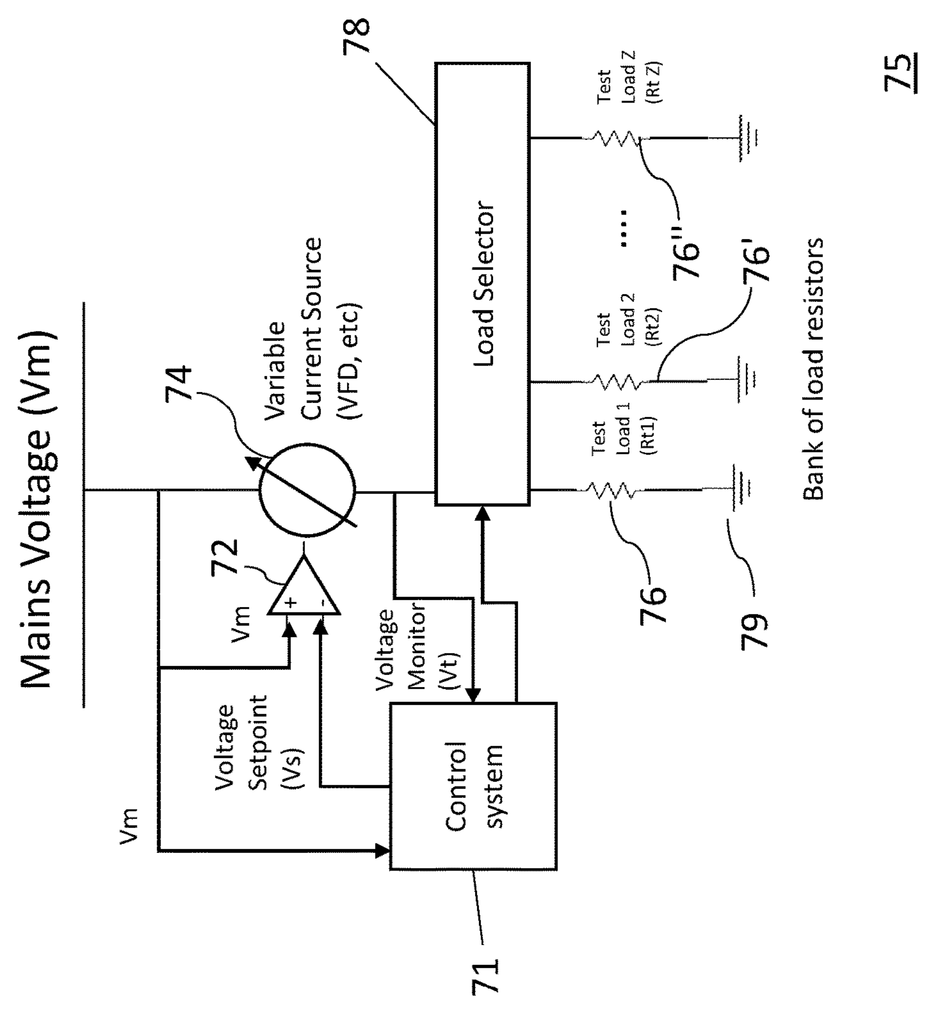
FIG. 11 provides a schematic power detection diagram employing a test load bank feature according to an additional embodiment of the present invention.

FIG. 11 provides an additional embodiment of the power detection device or unit 75 which may be suited for certain applications where a power generation asset 31 may have significant changes to power availability over short periods of time and slow changes over long periods of time. For example, in a hydro power generation asset, additional water dam openings may be open to turn on additional generators after a significant rainstorm which will produce more power. In this scenario, the control system 71 may want to test if an individual CPU should be put into operation, a group or small bank of computers should be out into operation, or a large bank of computers should be put into operation.

Conversely, the hydro generation asset may slowly produce less power as the damned lake is drained over a period of days, weeks or months. In this scenario, the device 75 may want to test if an individual CPU should be put into operation, a small group or bank of computers should be put into operation, or a large group or bank of computers should be put into operation. Described another way, since the array of CPUs 46 can be individually controlled as well as controlling racks of CPUs, rows of CPUs, or groups of CPUs the system may want to ramp up or down batches of CPUs based on available power. To enable this scenario, the device 75 can include a variety of load resistances 76, 76', 76" which can be used to determine if there is enough power to ramp up batches of CPUs through the data center load manager 42. These test resistors 76, 76', 76" could be connected or disconnected to the variable current source 74 by a load selector 78. The load selector could be manually controlled or managed by the control system 71. This would allow the system 75 to utilize various test loads 76, 76', 76" to determine available power.

The unit 75 would work like the unit 55 in FIG. 10 except that different test load resistors 76, 76', 76" could be cycled by the control system 71 to determine the available power. Essentially, the device 75 could start with a low resistance or load 76 and if it meets the required threshold, load resistance or load 76' could then be tested where the process continues with the increasing test load resistors 76, 76', 76" until the unit 75 determines there is not enough power to overcome the load. Alternatively, the device 75 could test the highest load 76" first and then cycle through the test loads 76, 76', 76" in descending order. The device 75 in FIG. 11 works like the load detector device circuit 55 in FIG. 10, except that the load selector 78 can select the appropriate resistance or test load 76, 76', 76" based on instructions from the control system 71.

The test loads 76, 76', 76" can be associated with logical groupings of computers such as the first test load (Rt1) 76 equates to one CPU, the second test load (Rt2) 76' equates to five CPUs, test load three equates to ten CPUs, and test load four (RtZ) 76" equates to 20 CPUs. Alternatively, the test loads can equate to one CPU, a rack of CPUs, multiple racks of CPUs, or an entire column or row of CPUs. They can also equate to different types of CPUs if the power requirements for the CPUs are different. However, the Data Center Load Manager 42 will have logic to convert the number of CPUs such that it can determine that a test indicating there is enough power to begin processing ten CPUs of one type might only equate to eight CPUs of a different type. This is especially useful if the CPUs are ideally suited or tailored for mining different types of cryptocurrencies and the Data Center Load Manager 42 determined the cryptocurrency pricing and processing for one type of cryptocurrency is preferable.

Figure 12:
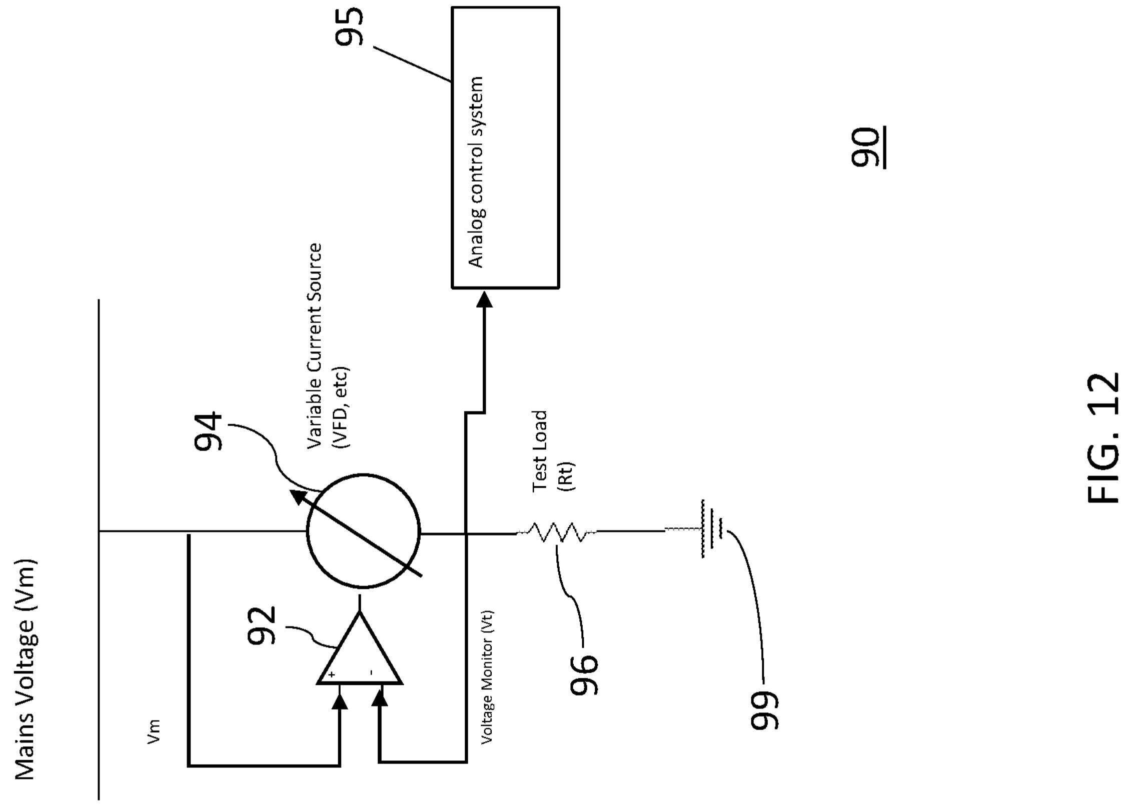
FIG. 12 provides a schematic power detection diagram employing an analog control system according to an additional embodiment of the present invention.

FIG. 12 provides an alternative method of implementing the power detection system 90. The system 90, will be implemented as an analog control system to drive the variable current source. The system 90 will include an analog control system 95 which is connected to the amplifier 92, the amplifier is connected to the variable current source 94, the analog control system 95 also receives the voltage main is connected to the amplifier 92 and the variable control source is connected to the test load or resistor 96 which is connected to ground 99. In this system 90, the analog control system 95 still drives the variable current source with input from the amplifier 92 through the test load 96 to manage current and voltage. The analog control systems 95 can then provide the data from the analysis and calculations to the data center load manager 42. Additional implementations of the test load 96 could include a variable power source or a variable voltage source with current measured through the current detectors, and the frequency within which either voltage or current is measured through the test load 96 can be varied.

Figure 13:
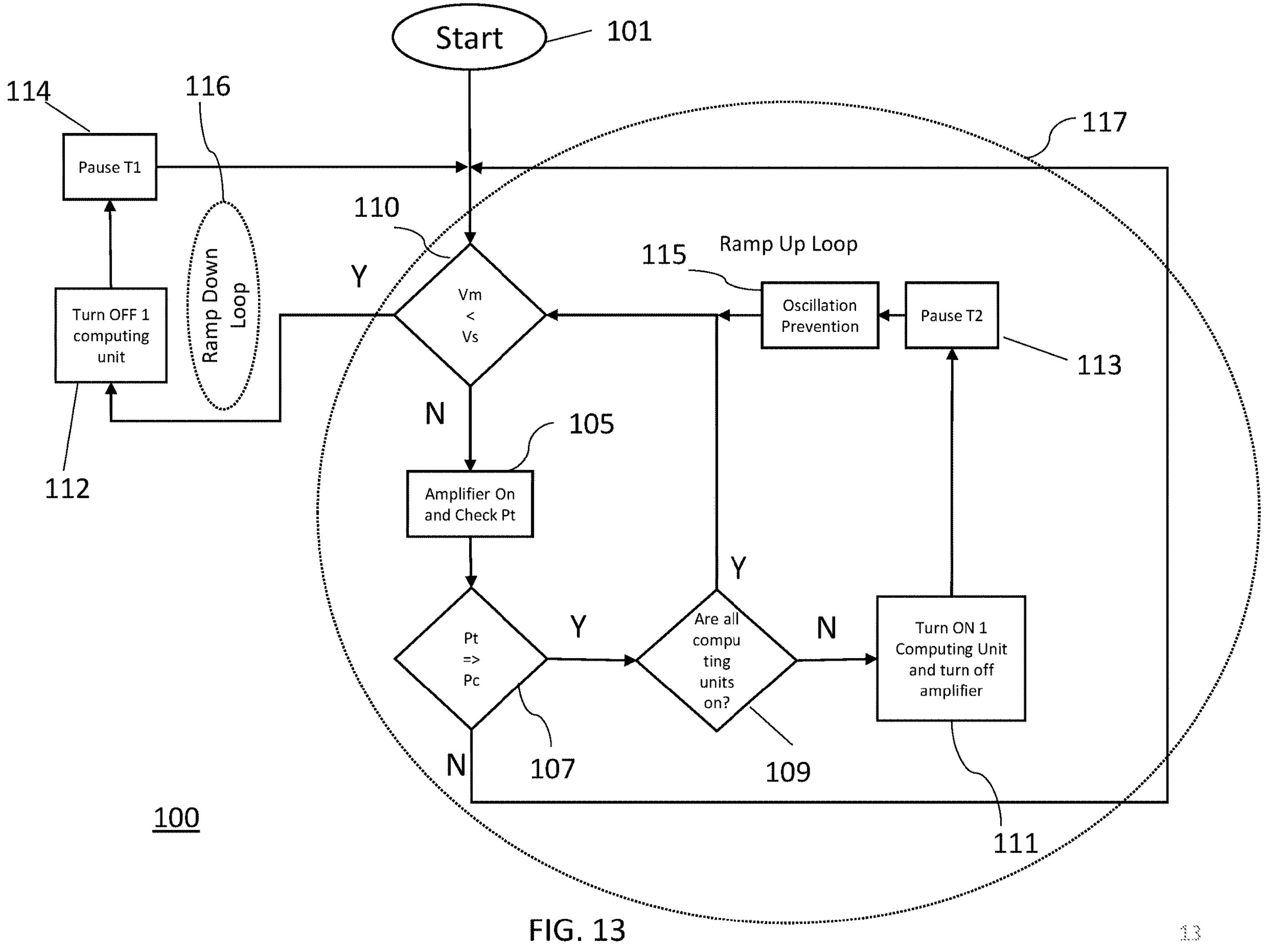
FIG. 13 provides a flowchart diagram of a method for controlling the ramping up or ramping down the number of mining computers/CPUs in operation, according to a preferred embodiment of the present invention.

FIG. 13 provides the decision tree or the control system logic for ramping up or ramping down processing units. The control system logic flow 100 starts at step 101 which proceeds to step 110 where the system determines if Vm, the voltage from the voltage mains line, is less than Vs which is the voltage set point. By checking that the voltage mains line (Vm) is above or below the voltage set point (Vs) first, the system is able to avoid having the load test by the detection unit impacting the available power the CPUs in operation. As previously discussed, the voltage setpoint (Vs) can be set to a voltage level which will avoid an impact to the CPUs in operation. Further, if the Vm is less than Vs than a CPU should be turned off or pulled from operation to decrease the CPU load on the voltage mains line (#51 in FIGS. 6 and 7).

In the event (step 110) that Vm is less than Vs, the system proceeds to step 112 where the power detection unit (#55 FIG. 4) notifies the data center load manager (#42 in FIG. 4) to turn off or halt operation of a CPU. Next the logic moves to step 114, and a pause or delay is implemented and then the logic flows back to step 110 to determine if Vm is less than Vs. As the logic flows that there is not enough power, the system continues to test the voltage main (Vm) against the voltage set point (Vs), and if the voltage main is less than the voltage set point (Vm<Vs), it returns to step 112 and continues the process of turning off computers. This is known as the ramp-down loop 116 of the control system logic 100.

In the event (step 110) Vm is equal to or greater than Vs, system knows it can test a load on the Voltage mains 51 without impacting CPUs already in operation. Therefore, if Vm is greater than or equal to Vs the logic flows to step 105. Step 105 turns the amplifier on and tests the power (step 107) through the test load (#76 in FIG. 10) and determines if the power through the test load (Pt) is equal to or greater than the power required for a typical CPU (Pc). If the power thru the test load is equal to or greater than the Pc (power required for one or more CPUs), then the logic flows to step 109. Step 109 determines if all computing units are on. If yes, then the logic returns to step 110. If no, the logic moves to 111. Step 111 turns on one or more CPU units, based on the test load 76 by notifying the data center load manager 42 which then controls the operation of CPU(s). In addition, in step 111, the amplifier (#72 in FIG. 10) is turned off. After the amplifier is turned off, there is a pause or delay (time can be set or controlled) in step 113. The pause in step 113 prevents an oscillation in step 115. After the pause 113 and oscillation prevention 115, the system logic goes back to the original step 110 to begin the process again with another check that Vm<Vs, and if Vm is greater than or equal to Vs, it proceeds to the power determination 107, and on to steps 111, 113, 117. This flow is considered the ramp up loop 117. The ramp up loop 117 continues until all computing units are on in step 109 or that the power through the test load (Pt) is not greater than or equal to the power required (Pc) in step 107, or that the Vm is less than Vs in step 110.

Through this flow logic 100, the power detection system can notify the data center load manager 42 to control the CPUs to go into a processing state or into a sleep state based on real time power availability or fluctuations. The system or the logic 100 can also embed certain protection variances such as setting the Voltage setpoint (Vs) or the test load 76 to avoid undesirable cycling of the CPUs. Through the system logic 100, the system can control the number of CPUs going into a processing state or into a sleep state prior to the load of the CPUs becoming a problem for the available power so that you do not have CPU units cycling on and off as such is undesirable as previously described.

Figure 14:
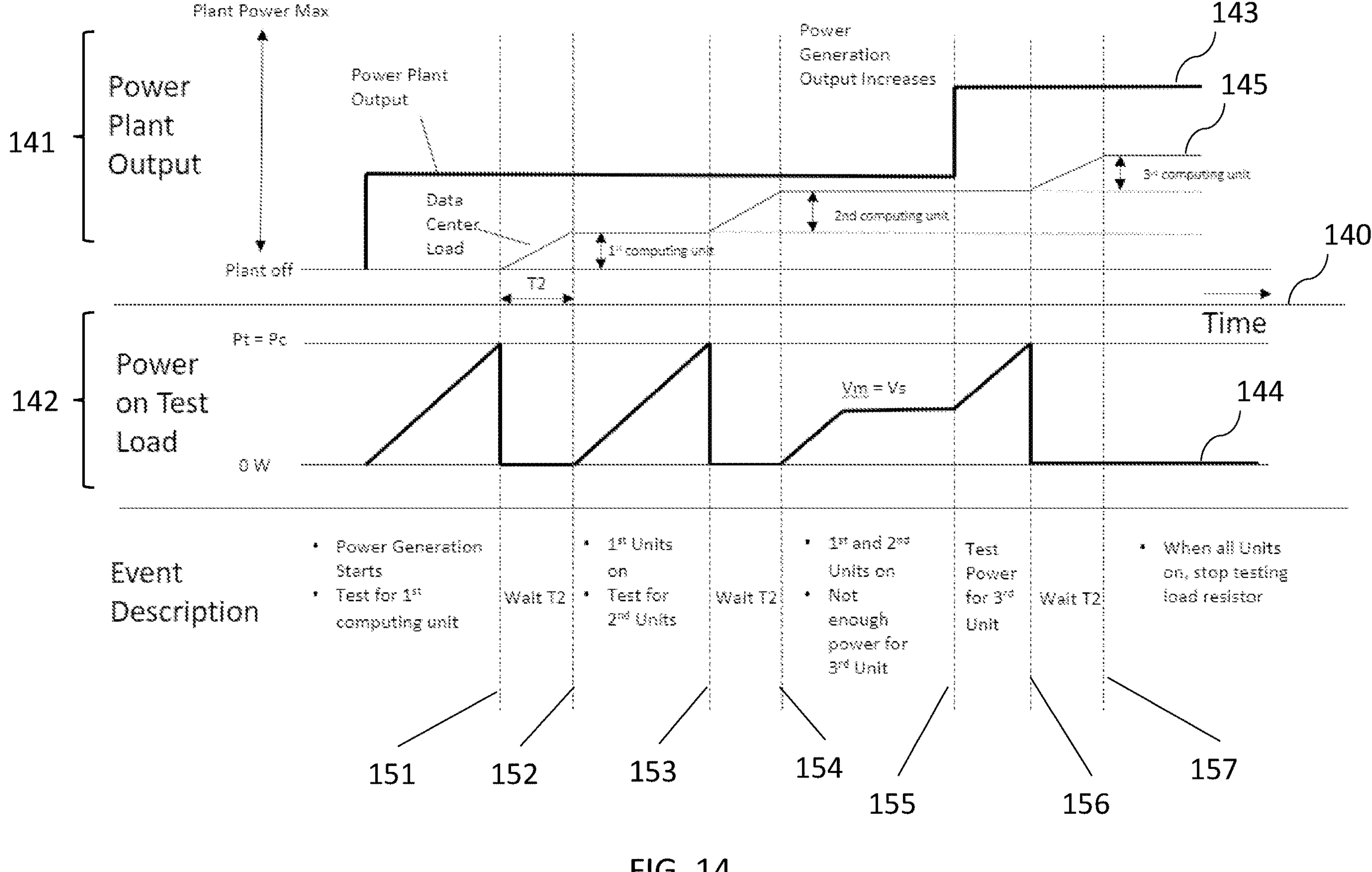
FIG. 14 provides a time-based comparison of a power plant power output graph and the power on the test load graph during operation of the present invention.

FIG. 14 provides a comparison of the power plant output 141 as compared to the power determined though the test load 142 across timeline 140. The power output line 143 represents the power output from the power plant output 141. As can be seen from the power output line 143 across timeline 140, the power increases over time which is typical for variable power generation assets 31 such as a solar field. In addition, line 144 represents the power determined by the power detection unit 5545 for the power determined through the test load 142. Additionally, line 145 represents the data center load as determined by the number of CPU units (in the CPU array 46) in operation tracked long timeline 140.

As indicated at various timeline 140 events 151-157, various events occur which impact the power on the test load 142. Initially, the power from the power plant output 141 has no power on the test load 142. However, as power from the power plant output 141 increases so too does the power on the test load 142. At event 151, the power on the power output line 143 and the power on the test load line 144 has reached the point where the power on the test load 142 has Pt=Pc. This is an indication that the power detection unit 55 has determined a CPU unit, or CPU units, can be put into operation or begin processing data. Thus, the power detection unit 55 would communicate with the data center load manager 42 to bring a CPU or CPUs into operation.

As described above in conjunction with FIG. 13, a pause (T2) is incorporated into the flow logic to allow the CPU unit (or CPU units) to become fully operational so that the load of the additional CPU unit(s) is accounted for along the mains voltage line 51. Essentially, so that the power on the test load is realistic to the load of all operating CPU units. Therefore, as indicated at event 152, the data center load 145 is now elevated and the power detection unit 55 can begin testing again to see if an additional CPU unit can be added. The detection unit 55 conducts a second assessment and, at event 153, it is determined that Pt=Pc and a second CPU unit(s) can be added or put into operation. Again, the power detection unit 55 would communicate with the data center load manager 42 to bring an addition CPU or CPUs into operation. Another intentional time delay is invoked until event 154 at which point the additional CPU(s) are fully operational which can be seen the data center load 144 has increased.

The detection unit 55 conducts an additional analysis, between event 154 and 155 where the power on the test load 144 is analyzed with the first and second CPU units in operation. However, the detection unit 55 determines there is not enough power to power a third CPU unit as evident at event 155. However, at event 155 we can see that the power plant output has increased the power available as indicated by the increase in available power along power line 143. Thus, at event 156, the detection unit analyzes the power on test load 142 and, as seen on the power on test load line 144, determines that Pt=Pc. Therefore, the power detection unit 55 has determined a third CPU unit(s) can be added. Again, the system invokes a time delay (T2) between events 156 and 157 to allow the third CPU unit(s) to come fully online and in operation. As evident at event line 157 along the data center load line 145, the third unit is fully in operation.

This example as described in combination with FIG. 14 shows the progress of adding CPU units as the power on test load 142 determines there is enough power to increase the number of CPU units which is determined by power from the plant output 141, the load (#76 in FIG. 10) in the detection unit 55, and the data center load 145 along the mains voltage line impacting the available power for additional CPU units. This process, the ramp up look 117 in FIG. 13, is repeated until all available CPU units are in operation or until the power detection unit 55 determines there is not enough power to bring additional CPU units into operation.

As indicated in FIG. 13, if Pt is not equal to or greater than Pc, then the system determines if the Vm is less than Vs. If the Vm is less than Vs, then the system works in reverse and drops or removes a CPU unit from operation. This would be the ramp down loop 116 and the system will continue to test whether there is enough power to add a CPU unit or if the Vm is less than Vs a CPU needs to be removed from operation. Therefore, as the power plant output 141, as seen by the power plant output line 143, either increases or decreases the power on the test load and the system will determine whether to add a CPU unit or drop a CPU unit or hold consistent. As the power detection unit 55 makes the determination to add or drop a CPU unit it notifies the data center load manager 42. The data center manager 42 is responsible for determining which CPU units within the CPU unit array 46 to add or drop. The data center manager 42 also works with the power enable unit 44 or the software enable unit 45 to control the CPUs in operation. As previously indicated, the power enable unit 44 controls CPUs by controlling various relays or connectors (as seen in discussed in FIG. 6) or the software enable unit 45 controls CPUs by controlling data flow (as seen in described in FIG. 7).

In one embodiment, the system 100 could compare the cost or price of available power and other relevant operating costs as well as the value obtained by mining varying types of cryptocurrencies during the period for any given machine and select the best mining CPU option or CPUs. If the value of a given CPU machine's output exceeds the price of power and operating costs, then a decision is made to mine for such cryptocurrencies. If the value of a given machine's output is below the price of power, then the system 100 can choose to not have the CPUs mine for cryptocurrency and instead direct that power to a better and more profitable use.

In one embodiment, the power cost and availability could be determined by accessing cost of power and working hours per day from the power plants. In one embodiment, the power cost and availability could be determined by other people, publicly available databases or real-time or daily grid power pricing from the utility or regulatory authorities or market makers, power brokers, and projection models based on past observable inputs.

In one embodiment, other variable costs associated with mining vs not-mining could be determined depending on the length of the shutdown, there may be variable costs that could be trimmed, and thus might affect the comparable calculation. In addition to the cost of power, it must consider labor required and the ability to eliminate shifts of employees during shutdowns, internet bandwidth requirements, other utility costs, and carbon offset costs (RECs).

In one embodiment, the value of mining computer hash power could be determined through the mining pool operator by offering a "bid price" for the hash power (often payable in a variety of digital currencies). In one embodiment, the value of mining computer hash power could be determined by calculating and using information about grid difficulty (via widely available 3rd party sources or from a network node) and divide the respective computer's hash power into that difficulty to determine what share of the block rewards and transaction fees will be awarded on a probability-adjusted basis. In one embodiment, the value of mining computer hash power could be determined through available multiple 3rd-party online calculators, which can assist the miners in determining the expected production at any given time for any given hardware type.

Although the system of the present invention is primarily described for use in data centers running a plurality of CPUs or computing systems, including crypto-mining computing systems, the present invention is not limited to such an implementation. The present invention is applicable to many systems which have a variable power input and a plurality of power consuming units where the number of units that can be operated is dependent upon the available power at any given time. Such other applications may include, for example: (1) heavy manufacturing or raw goods production (i.e. turning on one or more manufacturing lines or machines based on available power supply; (2) Steel smelting (i.e., ramping up or turning on the next arc furnace based on available power supply); (3) electrical vehicle (EV) charging (i.e., allowing one or more incremental chargers to turn on and start supply the connected EV battery based on available power supply—on solar power during mornings and evenings, for example), or (4) charging a grid of battery cells connected to a variable power asset. This is not an exhaustive list and merely an example of other applications for the present invention.

The systems and methods of the invention in the described embodiments may be implemented as a system, method, apparatus or article of manufacture using programming and/or engineering techniques related to software, firmware, hardware, or any combination thereof.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated that those individual aspects of the present disclosure can be separately claimed.

The term "computer-readable medium" as used herein refers to any tangible storage and/or transmission medium that participates in storing and/or providing instructions to a processor for execution. Such a medium may take many forms, including but not limited to, nonvolatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attached to an email or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Further, while reference is made to various types of databases, it will be understood by one of ordinary skill in the art that all of the database functions may be stored within compartments of a single database, or within individual databases. In any event, the disclosure is considered to include a tangible storage medium or distribution medium and prior art-recognized equivalents and successor media, in which the software implementations of the present disclosure are stored.

The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may be further implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In an embodiment of the invention, the systems and methods use networks, wherein, the term, 'networks' means a system allowing interaction between two or more electronic devices and includes any form of inter/intra enterprise environment such as the world wide web, Local Area Network (LAN), Wide Area Network (WAN), Storage Area Network (SAN) or any form of Intranet.

In an embodiment of the invention, the systems and methods can be practiced using any electronic device. An electronic device for the purpose of this invention is selected from any device capable of processing or representing data to a user and providing access to a network or any system similar to the internet, wherein the electronic device may be selected from but not limited to, personal computers, mobile phones, laptops, palmtops, tablets, portable media players and personal digital assistants.

As noted above, the processing machine used to implement the invention may be a suitable computer or other processing machine. The processing machine may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system (OS). Thus, embodiments of the invention may include a processing machine running the Unix operating system, the Apple iOS operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system (such as macOS™), the Apache operating system, an OpenStep™ operating system, the Android™ operating system (and variations distributed by Samsung, HTC, Huawei, LG, Motorola, Google, Blackberry, among others), the Windows 10™ operating system, the Windows Phone operating system, the Windows 8™ operating system, Microsoft Windows™ Vista™ operating system, the Microsoft Windows™ XP™ operating system, the Microsoft Windows™ NT™ operating system, the Windows™ 2000 operating system, or another operating system or platform.

The systems and methods of the invention may utilize non-operating systems (aka serverless architecture) as well for distributed processing. In the processing of the invention, services on cloud computing networks leveraging systems like AWS (as offered by Amazon Web Services, Inc.), BlueMix (as offered by IBM), and Microsoft Azure, can perform data collection services using varying technologies that are spun up on demand using tools like Chef to create container-based deployments like Docker, or non-container compute services (e.g., AWS Lambda).

The invention may use or provide real-time analytics processing that may use scale on demand to the users in the system, in accordance with at least one embodiment of the invention. Such offerings as AWS lambda and Kinesis (as offered by Amazon Web Services, Inc.) are among those that may be used in implementation of the invention. For example, AWS Lambda may be utilized to execute code (to perform processes of the invention) in response to various triggers including data changes, shifts in system state, or particular action taken by users. Similarly, in an embodiment, the OS (operating system) of the invention might be encapsulated in an EC2 instance (as offered by Amazon Web Services, Inc.) or multiple instances for deployment.

Another example of a traditional system is a device in the electrical distribution system that may speak a proprietary protocol or an older standardized protocol such as DNP3. In order to converge such a device to the modern grid it may be necessary to marshal its 'native' protocol into a new protocol such as IEC 61850. Further, it is often desired to do so in such a way that allows security policy to be specified and enforced independently of the application behavior, and it is also often necessary to participate more fully in field-area networks that may require localized edge processing and interaction over other protocols with other devices at the edge such that a portion of the distribution system may reasonably take some action independently of coordination through a centralized head-end. The present invention allows such systems to be realized, for example but not limited to: (1) allowing domain experts to quickly and efficiently specify application layer behavior independently of deep protocol expertise; (2) allowing multiple protocols to be bound to that application via an abstract data set, which allows different protocols to transparently interact with elements in that data set as necessary; (3) allowing a natural partitioning of application logic independently of the underlying protocols; and (4) allowing an architecture where protocol service behavior can be constrained by security policies (e.g. firewalling) independently of how an application layer will operate over that protocol.

It is appreciated that in order to practice the method of the invention as described above, it is not necessary that the processors and/or the memories of the processing machine be physically located in the same geographical location. That is, each of the processors and the memories used by the processing machine may be located in geographically distinct locations and connected so as to communicate in any suitable manner, such as over a network or over multiple networks. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, as also described above, various technologies may be used to provide communication between the various processors and/or memories, as well as to allow the processors and/or the memories of the invention to communicate with any other entity; i.e., so as to obtain further instructions or to access and use remote memory stores, for example. Such communication portion, component, system, or technologies used to provide such communication might include a network, the Internet, Intranet, Extranet, LAN, an Ethernet, wireless transceiver, a radio, or any client server system that provides communication, for example. Such communications technologies may use any suitable protocol such as TCP/IP, UDP, or OSI, for example.

Further, multiple applications may be utilized to perform the various processing of the invention. Such multiple applications may be on the same network or adjacent networks, and split between non-cloud hardware, including local (on-premises) computing systems, and cloud computing resources, for example. Further, the systems and methods of the invention may use IPC (interprocess communication) style communication for module level communication. Various known IPC mechanisms may be utilized in the processing of the invention including, for example, shared memory (in which processes are provided access to the same memory block in conjunction with creating a buffer, which is shared, for the processes to communicate with each other), data records accessible by multiple processes at one time, and message passing (that allows applications to communicate using message queues), for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer, processor, or portions of the processor understands the machine language.

Any suitable programming language may be used in accordance with the various embodiments of the invention. Illustratively, the programming language used may include assembly language, Ada, APL, Basic, C, C++, C #, Objective C, COBOL, dBase, Forth, Fortran, Java, Modula-2, Node.JS, Pascal, Prolog, Python, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, which enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, as also described above, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmission or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Preferred embodiments of this invention are described herein, including the best mode known to the inventors for carrying out the invention. It should be understood that the illustrated embodiments are exemplary only and should not be taken as limiting the scope of the invention.

The foregoing description comprises illustrative embodiments of the present invention. Having thus described exemplary embodiments of the present invention, it should be noted by those skilled in the art that the disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings in the foregoing descriptions. Although specific terms may be employed herein, they are used only in generic and descriptive sense and not for purposes of limitation. Accordingly, the present invention is not limited to the specific embodiments illustrated herein.

The invention claimed is:

1. An incremental power enable system comprising:

a variable power source for supplying power to a data center;

a plurality of computing systems within the data center, wherein the plurality of computing systems are configured to receive power from at least one power source;

an inverter to convert direct current to alternating current and to power the data center, wherein the inverter is connected to the variable power source and to the data center;

a power detection unit comprising a test load, an amplifier, and a variable current source, connected to a power supply line connected to the inverter;

wherein the power detection unit tests the current of the variable power source coming from the inverter and determines if there is enough power to provide power to an additional computing system from the plurality of computing systems;

a data center load manager comprising a processor and associated control logic connected to the power detection unit and the plurality of computing systems, wherein the data center load manager controls the number of computing systems in operation from the plurality of computing systems based on a signal from the power detection unit.

2. The incremental power enable system of claim 1, further comprising:

a computing enable unit, wherein the computing enable unit is connected to or integrated into the data center load manager and the plurality of computing systems.

3. The incremental power enable system of claim 2, wherein the computing enable unit is a power enable unit comprising switching elements and associated control logic configured to control power to the plurality of computing systems and can increase or decrease the number of computing systems in operation from the plurality of computing systems based on the power detection unit test.

4. The incremental power enable system of claim 2, wherein the computing enable unit is a software enable unit comprising network switching elements and a monitor server associated with control logic configure to controls the flow of data to the plurality of computing systems and to increase or decrease the number of computing systems in operation from the plurality of computing systems based on the power detection unit test.

5. The incremental power enable system of claim 1, wherein the power detection unit further comprises:

a test load, an amplifier, a variable current source, a voltage monitor, a voltage set point, and a control system;

wherein the test load is set to the power load of one or more computing systems;

wherein the voltage set point is set to a voltage below the mains voltage line of the data center;

wherein the control system receives an input voltage from the voltage across the test load and receives an input from the voltage mains line;

wherein the variable current source is driven by the output of the amplifier; and wherein the control system includes measurement logic configured to sense voltage and current across the test load and processes the sensed signals to determine power through the test load and to determines whether the power through the test load is equal to, greater than, or less than the power required for one or more computing systems of the plurality of computing systems.

6. The incremental power enable system of claim 5, wherein the test load is equivalent to a power load of one computing system of the plurality of computing systems.

7. The incremental power enable system of claim 5, wherein the test load is variable.

8. The incremental power enable system of claim 1, wherein the system can increase the number of computing systems in operation based on the analysis of the power detection unit.

9. The incremental power enable system of claim 1, wherein the system can decrease the number of computing systems in operation based on the analysis of the power detection unit.

10. A power detection unit for a data center comprising:

a test load, an amplifier, a variable current source, a voltage monitor, a voltage set point, and a control system including measurement logic configured to sense voltage and current across the test load;

wherein the test load is set to the power load of one or more computing systems within the data center;

wherein the voltage set point is set to a voltage below the mains voltage line of the data center;

wherein the control system receives an input voltage from the voltage across the test load and receives an input from the voltage mains line;

wherein the variable current source is driven by the output of the amplifier; and wherein the control system processes the sensed voltage and current to determine power through the test load and determines whether power through the test load is equal to, greater than, or less than the power required for one or more computing systems of the plurality of computing systems.

11. The power detection unit for a data center of claim 10, wherein the power detection unit is connected to a variable power source.

12. The power detection unit for a data center of claim 11, wherein the power detection unit is connected to a plurality of computing systems within the data center, wherein the plurality of computing systems are configured to receive power from the variable power source.

13. The power detection unit for a data center of claim 11, wherein the power detection unit is connected to a data center load manager and a plurality of computing systems; and wherein the data center load manager controls the number of computing systems in operation from the plurality of computing systems based on an analysis from the power detection unit.

14. A method of incrementally increasing or decreasing a plurality of computing systems in operation in a data center based on available power from a variable power source, comprising the steps of:

a) determining by a power detection unit if a mains voltage of the data center is less than a voltage set point;

b) reducing, if the mains voltage of the data center is less than the voltage set point, the number of computing systems in operation by at least one computing system;

c) analyzing, if the mains voltage of the data center is greater than the voltage set point, if there is enough power to power an additional computing system by:

1) powering an amplifier in the power detection unit, wherein the amplifier is used to power a variable current source;

2) analyzing a voltage of the variable current source across a test load;

3) determining available power based on the voltage of the variable current source across the test load and the variable current;

d) determining if the available power is equal to or greater than a power level required for at least one computing system of the plurality of computing systems;

e) verifying at least one computing system of the plurality of computing systems is not in operation;

f) transmitting, if at least one computing system of the plurality of computing systems is not in operation, a signal to a data center load manager to increase the number of computing systems in operation by at least one computing system; and g) repeating, if at least one computing system of the plurality of computing systems is not in operation, steps a-f.

15. The method of claim 14, further comprising the steps of:

controlling the number of computing systems in operation of the plurality of computing system by controlling the supply of power to the one or more computing systems of the plurality of computing systems.

16. The method of claim 14, further comprising the steps of:

controlling the number of computing systems in operation of the plurality of computing system by controlling the supply of data to the one or more computing systems of the plurality of computing systems.

17. The incremental power enable system of claim 1, wherein the plurality of computing systems are crypto mining computing systems.

18. The power detection unit of claim 10, wherein the plurality of computing systems are crypto mining computing systems.

19. The method of claim 14, wherein the plurality of computing systems are crypto mining computing systems.

* * * * *